(12) United States Patent
Mizuno

(10) Patent No.: US 6,480,784 B2
(45) Date of Patent: Nov. 12, 2002

(54) METHOD AND APPARATUS FOR APPLYING DECIMATION PROCESSING TO VEHICLE POSITION DATA BASED UPON DATA ACCURACY ESTIMATION

(75) Inventor: Masaru Mizuno, Yokohama (JP)

(73) Assignee: Matsushita Electric Industrial Co., Ltd. (JP)

( * ) Notice: Subject to any disclaimer, the term of this patent is extended or adjusted under 35 U.S.C. 154(b) by 0 days.

(21) Appl. No.: 09/811,412

(22) Filed: Mar. 20, 2001

(65) Prior Publication Data

US 2001/0018636 A1 Aug. 30, 2001

(51) Int. Cl.$^7$ .............................................. G01C 21/26
(52) U.S. Cl. .................. 701/207; 701/214; 342/357.01; 342/357.02
(58) Field of Search ................................. 701/207, 213, 701/214, 35, 24, 25, 210; 342/352, 357.01, 357.02, 357.08

(56) References Cited

U.S. PATENT DOCUMENTS

| | | | |
|---|---|---|---|
| 5,155,684 A | * 10/1992 | Burke et al. | 318/587 |
| 5,155,688 A | 10/1992 | Tanaka et al. | 364/454 |
| 5,839,087 A | * 11/1998 | Sato | 340/990 |
| 6,141,609 A | * 10/2000 | Herdeg et al. | 340/995 |
| 6,292,751 B1 | * 9/2001 | Frank | 701/220 |

FOREIGN PATENT DOCUMENTS

| | | | | |
|---|---|---|---|---|
| EP | 0 523 860 A3 | 1/1993 | | |
| EP | 0 523 860 A2 | 1/1993 | | |
| EP | 1055936 | 11/2000 | | |
| JP | 03035115 A | * 2/1991 | | G01C/21/00 |
| JP | 03291519 A | * 12/1991 | | G01C/21/00 |

* cited by examiner

Primary Examiner—Jacques H. Louis-Jacques
(74) Attorney, Agent, or Firm—Parkhurst & Wendel, LLP

(57) ABSTRACT

A method and apparatus for use with a mobile body navigation system are provided for reducing an amount of position data, expressing successive positions along a route that has been traversed by a mobile body, which are recorded by a data recording section to subsequently provide a route display or are transmitted by radio by a data transmitting section. A position recording judgement section uses one or more judgement criteria to obtain an indication of the degree of accuracy of each of the vehicle positions that are calculated by the navigation system, and enables recording or transmission of only those data that express positions for which the judgement criteria indicate that the corresponding degree of accuracy is sufficiently high.

19 Claims, 15 Drawing Sheets

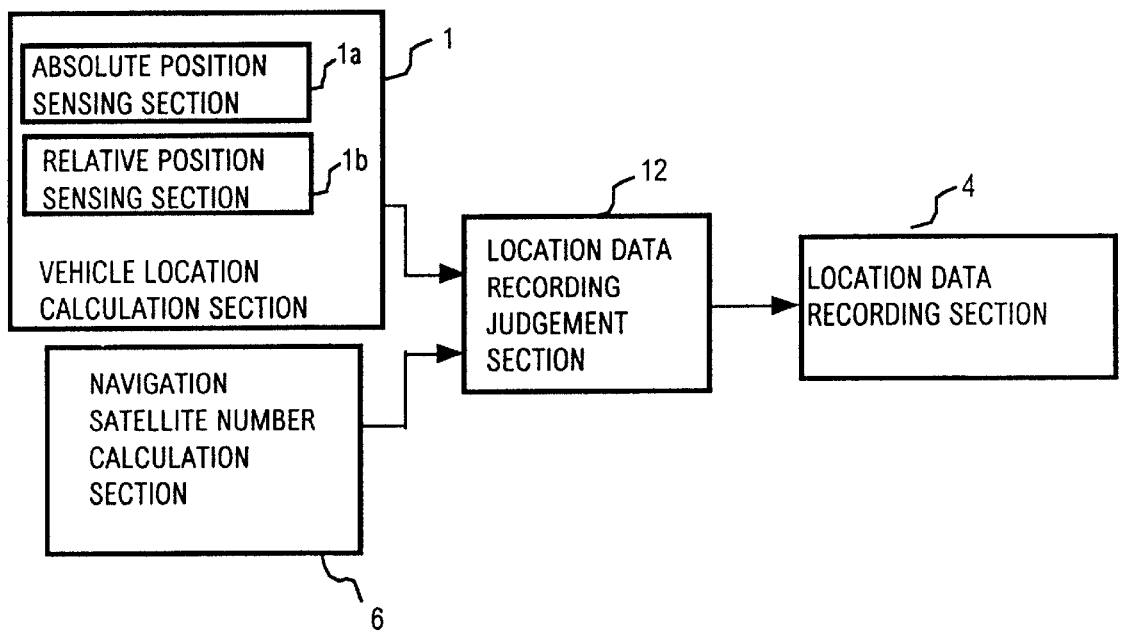
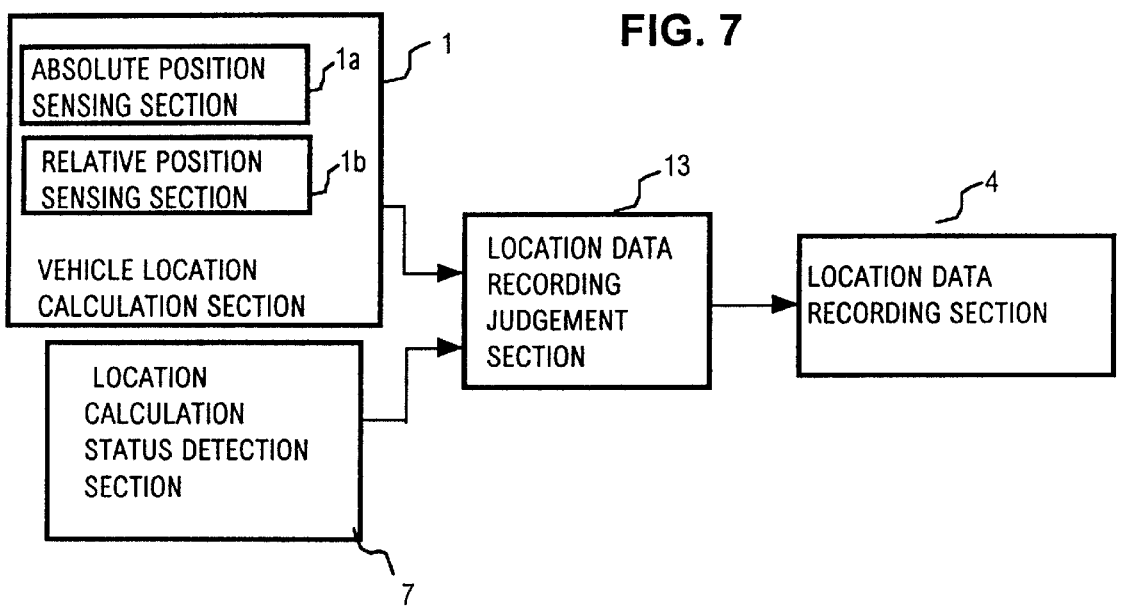

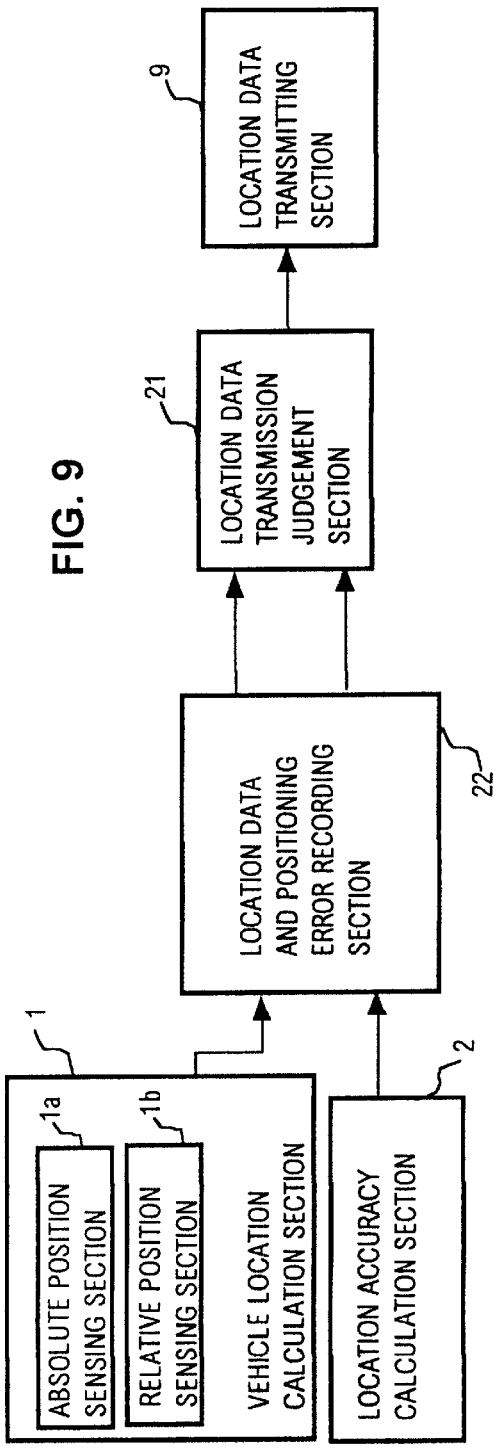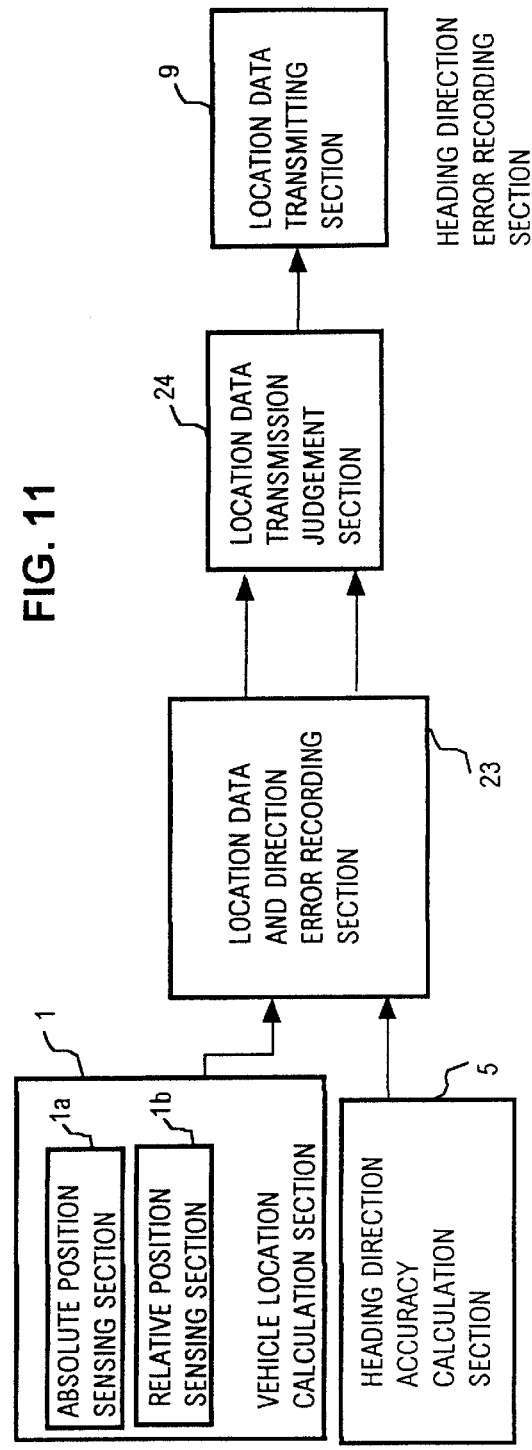

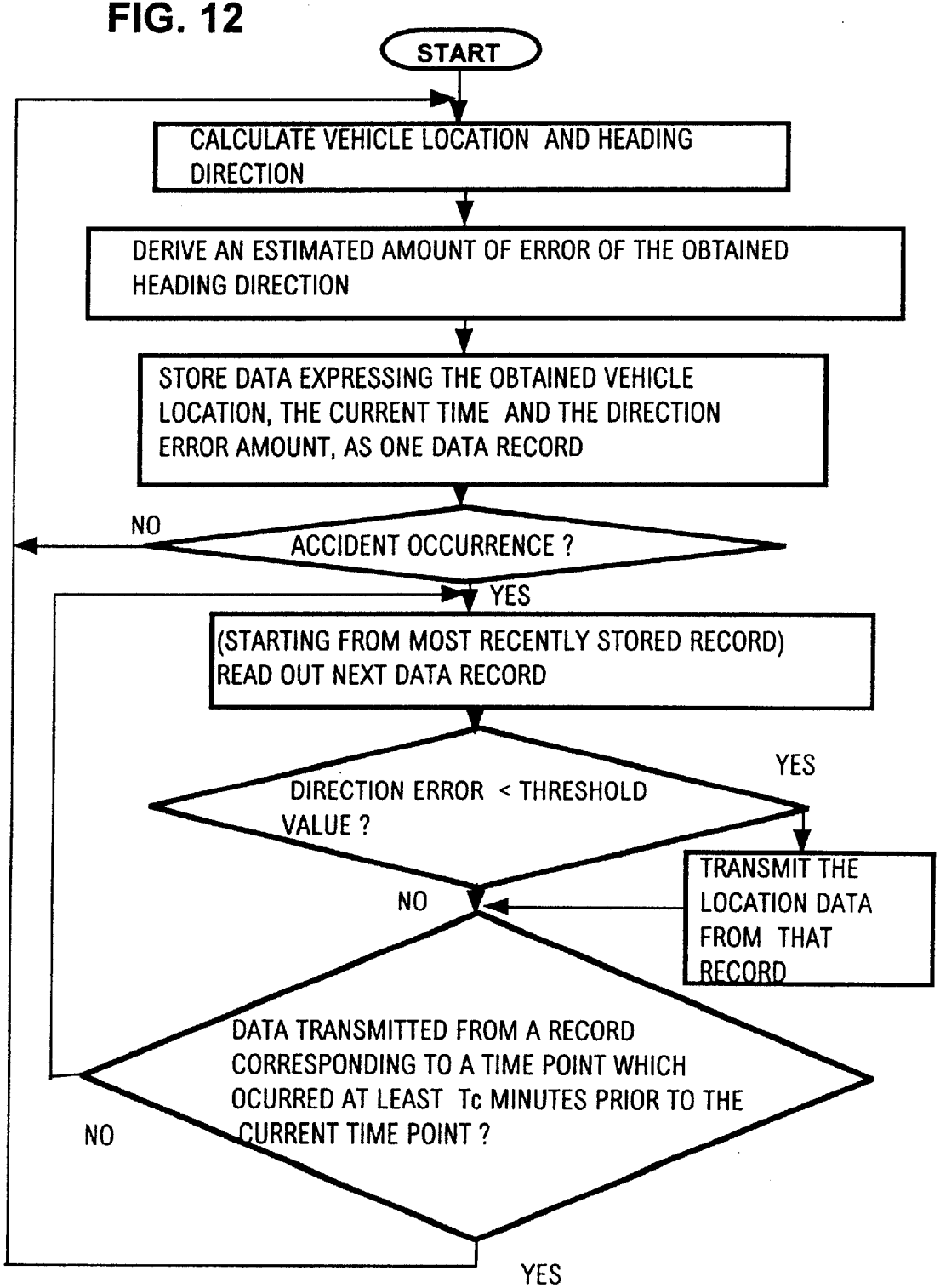

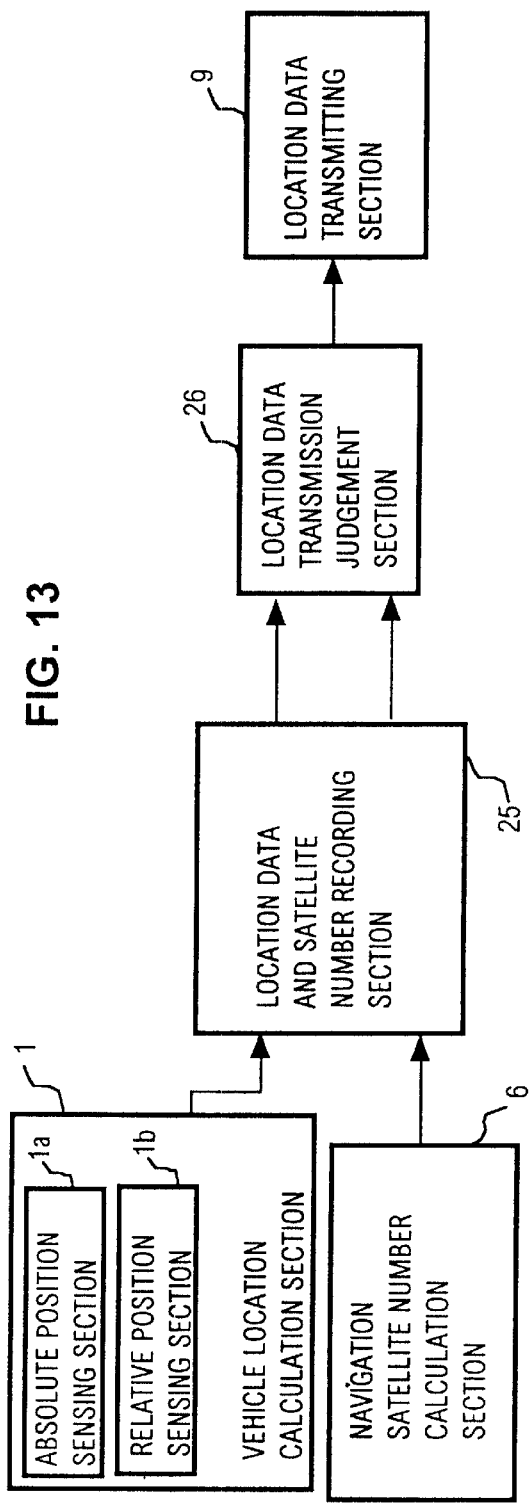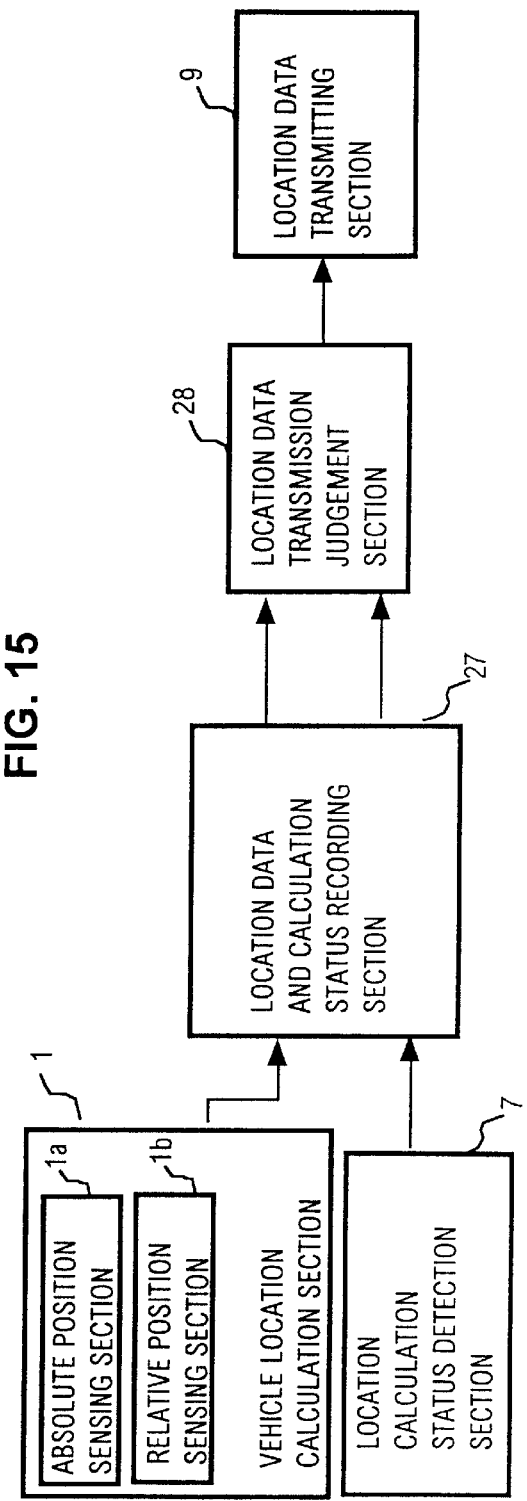

| RECORDING TIME POINT | LONGITUDE | LATITUDE | DISTANCE SINCE PRECEDING RECORDING TIME POINT |
|---|---|---|---|
| 10:40:29 | 135° 17' 12" | 40° 02' 02" | 10 m |
| △ 10:40:30 | 135° 17' 13" | 40° 02' 03" | 32 m |
| : | : | : | : |
| △ : | : | : | : |
| 11:01:04 | 135° 02' 54" | 40° 17' 31" | 25 m |
| △ 11:01:05 | 135° 02' 54" | 40° 17' 31" | 0 m |
| △ : | : | : | : |
| △ : | : | : | : |
| △ 11:21:02 | 134° 42' 54" | 40° 27' 31" | 25 m |
| △ 11:21:03 | 134° 42' 53" | 40° 27' 30" | 42 m |

1 km  2 km  3 km

METHOD AND APPARATUS FOR APPLYING DECIMATION PROCESSING TO VEHICLE POSITION DATA BASED UPON DATA ACCURACY ESTIMATION

BACKGROUND OF THE INVENTION

1. Field of the Invention

The present invention relates to an improvement of a mobile body navigation apparatus having a capability for recording and displaying position data representing all or part of a route which has been traversed by a mobile body such as a motor vehicle, or for transmitting position data representing the traversed route and current position by radio in the event of an emergency.

2. Description of the Prior Art

Prior art types of navigation apparatus for mounting on a mobile body such as a motor vehicle are known, having a traversed route display function for displaying at least a part of the route which has been traversed by the vehicle. Successively calculated sets of position data for generating this traversed route display, i.e., data expressing successively attained positions of the vehicle, are recorded temporarily in a data storage device, and read out therefrom for use in generating the route display. The present invention relates in particular to a hybrid vehicle navigation system, which utilizes a combination of systems for deriving both absolute positions and relative (i.e., dead-reckoning) positions. With such a system, absolute position fixes are periodically obtained, based on information conveyed by radio signals received from a navigation signal source such as the GPS (Global Positioning Satellite) system, so long as satisfactory signal reception continues. In the intervals between obtaining these absolute position fixes, relative (dead-reckoning) positions of the vehicle are periodically calculated, based on information provided by relative position sensors of the vehicle such as a speed sensor for detecting amounts of distance traveled by the vehicle since the most recent absolute position fix, and a direction sensor such as a vibration gyroscope for detecting changes in the vehicle heading direction. Each position may be specified only as a lateral position (i.e., a pair of longitude and latitude values), or may also specify altitude.

The amount of data storage capacity required for the route display function of such an apparatus is determined by the maximum length of route which is to be displayed, that is, the number of vehicle positions that must be stored to represent that length of route. It would be desirable to enable that maximum length of displayed route to be increased without a corresponding increase in the data storage capacity requirements and without significant lowering of accuracy of the displayed route.

Furthermore, in recent years, types of emergency vehicle dispatch system have been developed whereby when an emergency condition such as a traffic accident occurs for a motor vehicle, the dispatch of emergency services vehicles can be facilitated by transmitting data expressing the approximate position of the accident site directly from that vehicle, for example to an emergency services center. This done by using position data derived by a vehicle-mounted navigation system and transmission of the data from the vehicle by radio communication via, for example, a portable telephone equipped for digital data transmission. The emergency services center can thereby rapidly dispatch the appropriate emergency service vehicle to the position of the accident.

If only data expressing a single position (i.e., the approximate final position of the vehicle) are transmitted to the emergency services center, it may not be possible for the position of the accident site to be specified with sufficient precision. For that reason, it is preferable to transmit data expressing the most recently traversed part of the route that has been taken by the vehicle which is at the accident site, i.e., a sequence of positions extending up to the most recent position that has been derived by the vehicle navigation system. In that way, there is a greater likelihood that the emergency services center will be able to accurately judge the accident position based on the received data. In particular, when the route lies within a town or city, it becomes possible for the emergency services center staff to perform map-matching to accurately determine the accident position, i.e., the shape and orientation of the received route can be compared with the arrangement of streets in a map, to thereby reliably ascertain that the requisite position (the point of termination of the vehicle route) is on a specific street.

However due to the large amount of data which are necessary to express such a traversed route, a substantial amount of time will be required to transmit the necessary data. Hence, the problem arises that the time required to notify the necessary information to an emergency vehicle dispatch center may be excessively long. Conversely, if it is attempted to overcome this problem by transmitting only a small amount of position data, then it becomes difficult for the emergency vehicle dispatch staff to accurately judge the actual position of the accident site, so that effective dispatch of assistance may not be possible.

SUMMARY OF THE INVENTION

It is a first objective of the present invention to overcome the above problems of the prior art, by providing a position data decimation method and position data decimation apparatus for use with a vehicle navigation apparatus having a traversed route display function, whereby the amount of data required to be recorded for use in displaying all or part of a traversed route can be substantially reduced.

It is a second objective of the invention to provide a position data decimation method and position data decimation apparatus for use with a vehicle navigation apparatus having a capability for radio transmission of position data expressing a traversed route, whereby the amount of data required to be transmitted for expressing all or part of a route traversed by the vehicle can be substantially reduced.

The invention provides two basic methods of achieving these objectives. The first basic method is to decimate the data which must be recorded or transmitted (where the term "decimate data" is used herein in the general sense of selectively eliminating part of a series of data sets) by selecting only vehicle position data which are estimated to have a sufficiently high degree of positioning accuracy. That is to say, information (referred to in the appended claims as "indication information") is derived in conjunction with each calculated vehicle position, which is used as a criterion for estimating the probable degree of accuracy of that position. Various forms of implementing such indication information can be envisaged, as described in the following.

The second basic method is to vary the precision to which a traversed route is expressed (i.e., the number of obtained positions per unit of distance) in accordance with distance from the current position or the terminating position of the route. This can be done by dividing a traversed route into a plurality of sections, utilizing the data of all of the vehicle positions constituting the most recent section of the route, then utilizing only data of periodically selected ones of the vehicle positions of the next section of the route, and so on. Thus, the precision to which the route is represented by the vehicle position data is maximized for the part of the route which is closest to the current position of the vehicle, while the total amount of data used to represent the traversed route is reduced.

More specifically, to achieve the first objective, according to a first aspect, the present invention provides a position data decimation apparatus and method for use in a vehicle navigation apparatus having position calculation means for deriving position data expressing successive positions of a vehicle in which the navigation apparatus is mounted, position recording means for recording the position data, whereby the position data decimation apparatus comprises position accuracy calculation means for estimating respective amounts of positioning error in the calculated vehicle positions, and position recording judgement means for determining whether or not each derived vehicle position is to be recorded by the position recording means, with that determination being based on the results obtained by the position accuracy calculation means.

In that way, by ensuring that only position data having a sufficiently high level of accuracy is stored in memory, for use in subsequently generating a display of the vehicle's traversed route, the amount of data which must be stored in order to record a traversed route portion can be substantially reduced.

To achieve the first objective, according to a second aspect of the invention, rather than using position accuracy calculation means for estimating the accuracy of obtained positions, heading direction accuracy calculation means is used to estimate the accuracy of heading directions corresponding to respective derived positions of the vehicle. If the heading direction that is associated with an obtained vehicle position is judged to be of insufficient accuracy, then the position recording judgement means prevents the corresponding position data from being recorded.

To achieve the first objective, according to a third aspect of the invention, which is applicable to a vehicle navigation apparatus that obtains absolute vehicle position data based upon information supplied from navigation satellites such as GPS satellites, satellite number calculation means is used to estimate (for each obtained vehicle position) the number of satellites from which information is obtained. If the total number of satellites is judged to be insufficient, then the position recording judgement means prevents the corresponding position data from being recorded.

To achieve the first objective, according to a fourth aspect of the invention, which is applicable to a vehicle navigation apparatus that obtains absolute vehicle positions data based upon information supplied from navigation satellites such as GPS satellites and relative positions based on information from relative position sensors, only the absolute positions are recorded.

To achieve the second objective, according to a fifth aspect, the invention provides a position data decimation method and apparatus for use in a vehicle navigation apparatus having position calculation means for deriving position data expressing successive positions of a vehicle in which the navigation apparatus is mounted, position recording means for recording the position data, and position transmission means for transmitting the recorded position data by radio, whereby the position data decimation apparatus comprises position accuracy calculation means for estimating respective amounts of positioning error of the vehicle positions, and positioning error receiving means for recording the positioning errors.

If it is subsequently required to transmit data expressing a part of the traversed route, then the requisite recorded position data and accompanying positioning error values are read out and supplied to position transmission judgement means for determining whether or not each derived vehicle position is to be transmitted by the position transmission means, with that determination being based on the positioning error values.

In that way, by ensuring that only position data having a sufficiently high level of accuracy are transmitted by radio, expressing a portion of the vehicle's traversed route, the amount of data which must be transmitted can be substantially reduced, and hence the route data can be transmitted within a shorter period of time.

To achieve the second objective, according to a sixth aspect of the invention, rather than using position accuracy calculation means for estimating the accuracy of obtained vehicle positions, heading direction accuracy calculation means is used to estimate respective amounts of direction error in vehicle heading directions that are obtained together with the vehicle positions and are recorded. If an emergency occurs, the recorded vehicle positions and corresponding heading direction error amounts are read out. If the heading direction that is associated with an obtained vehicle position is judged to be of insufficient accuracy, then the position transmission judgement means prevents the corresponding position data from being transmitted.

To achieve the second objective, according to a seventh aspect of the invention, which is applicable to a vehicle navigation apparatus that obtains vehicle position data based upon information supplied from navigation satellites such as GPS satellites, satellite number calculation means is used to estimate (for each obtained vehicle position) the number of satellites from which information is obtained, with that number being recorded, and subsequently read out together with the corresponding vehicle position in the event of an emergency. For each of these vehicle positions, if the total number of satellites is judged to be insufficient, then this considered to indicate that the accuracy of the obtained position information is insufficient, and the position transmission judgement means prevents the corresponding position data from being transmitted.

To achieve the second objective, according to an eighth aspect of the invention, which is applicable to a vehicle navigation apparatus that obtains vehicle position data based upon information supplied from navigation satellites such as GPS satellites, the determination as to whether or not an obtained vehicle position is to be transmitted in the event of an emergency is made on the basis of whether or not the vehicle position is an absolute position, i.e. has been obtained directly based on a source of absolute position information such as GPS information.

To achieve the second objective, according to a ninth aspect of the invention, the degree of precision of the route data is increased for a portion of the traversed route which is close to a desired final position, by comparison with portions of the traversed route which are more distant from the desired final position. Specifically, each of the derived vehicle positions is recorded in conjunction with the distance which the vehicle has moved since the preceding position was obtained. If it is subsequently required to transmit a portion of the traversed route, a set of successively obtained positions which extend to a specific cumulative distance from the current position, are each transmitted. A second set of successively obtained positions (extending from the farthest position of the first set), are then selected, and only a proportion of these are transmitted, for example every second position. This principal can be extended to one or more other sets of successively obtained positions, with the proportion of the contents of each set that are actually transmitted being reduced in accordance with distance from the final position of the vehicle. In that way, the final portion of the traversed route can be expressed with a high degree of precision by the transmitted data, while ensuring that the total amount of transmitted data can be reduced.

BRIEF DESCRIPTION OF THE DRAWINGS

FIG. 5 is a general system block diagram of a third embodiment, in which vehicle position data is judged based on a number of satellites used in deriving the data, and only positions which have been derived based on a satellite number that is above a predetermined level are selected to be recorded;

FIG. 7 is a general system block diagram of a fourth embodiment, in which only vehicle positions which have been obtained directly from GPS information are recorded for providing a route display;

FIG. 9 is a general system block diagram of a fifth embodiment, in which only vehicle position data having a sufficiently low degree of positioning error are selected to be transmitted to convey vehicle route information;

FIG. 11 is a general system block diagram of a sixth embodiment, in which only vehicle position data having a sufficiently low degree of heading direction error associated therewith are selected to be transmitted to convey vehicle route information;

FIG. 12 is a flow diagram for use in describing the operation of the embodiment of FIG. 11;

FIG. 13 is a general system block diagram of a seventh embodiment, in which vehicle position data are selected to be transmitted, to convey route information, based on a number of GPS satellites used in obtaining the data;

FIG. 15 is a general system block diagram of an eighth embodiment, in which vehicle position data are selected to be transmitted, to convey route information, based upon whether GPS satellite information was successfully used to establish the data;

DESCRIPTION OF PREFERRED EMBODIMENTS

Figure 1:
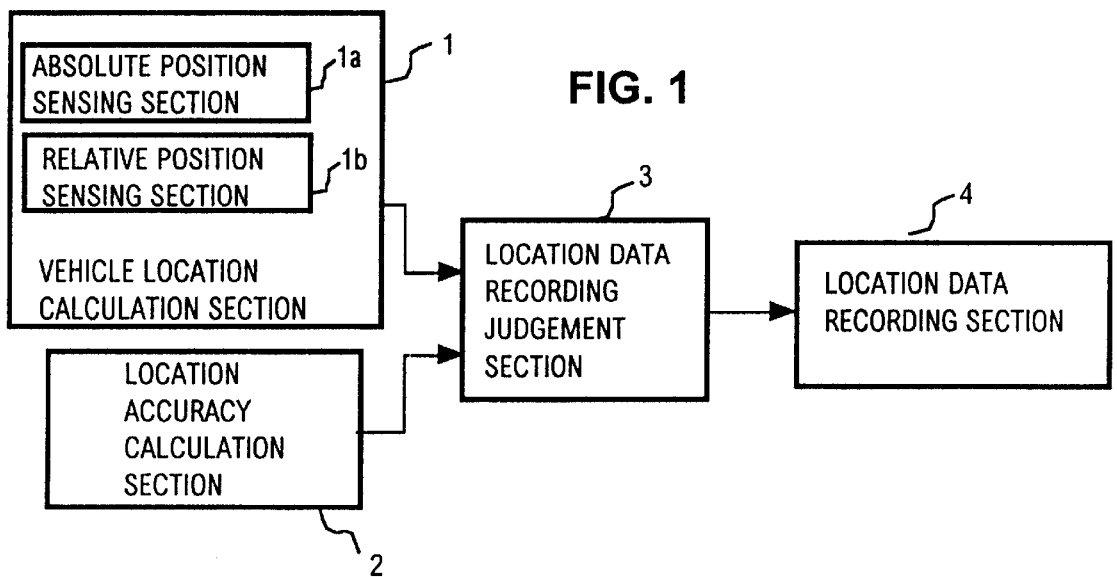
FIG. 1 is a general system block diagram of a first embodiment, which enables reduction of an amount of vehicle position data that are recorded for the purpose of generating a vehicle route display, by selecting for recording only those vehicle positions having an amount of estimated positioning error that is below a predetermined level.
Figure 2:
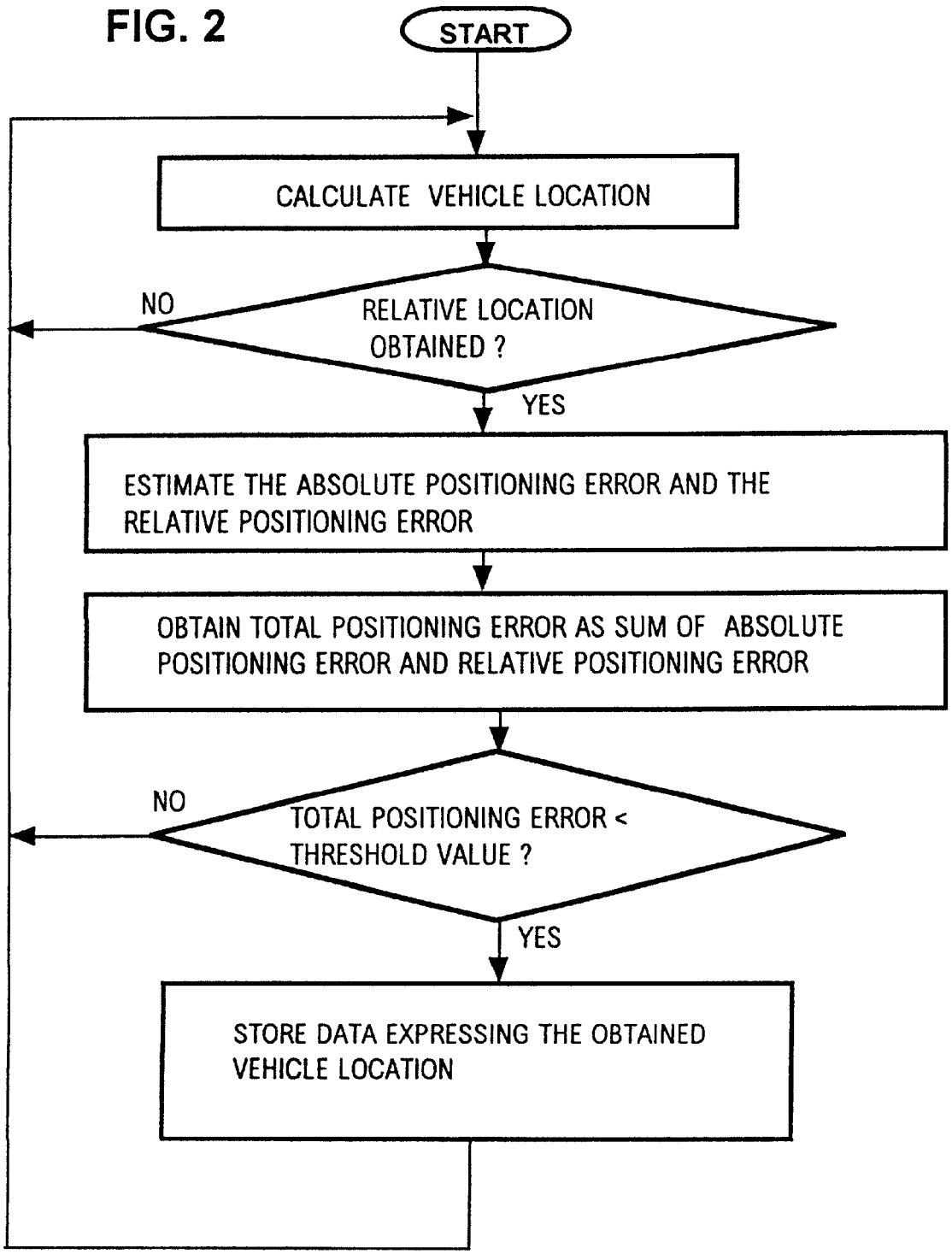
FIG. 2 is a flow diagram for use in describing the operation of the embodiment of FIG. 1.

Embodiments of the present invention will be described in the following referring to the appended drawings. FIG. 1 is a general system block diagram of a first embodiment of the invention, and FIG. 2 is a corresponding flow diagram for use in describing the operation of the first embodiment. In FIG. 1, an apparatus which is mounted in a motor vehicle consists of a vehicle position calculation section 1, a position accuracy calculation section 2, a position data recording judgement section 3 and a position data recording section 4. The vehicle position calculation section 1 and the position accuracy calculation section 2 supply respective data to the position data recording judgement section 3, which transfers selected parts of vehicle position data generated by the vehicle position calculation section 1, to be recorded by the position data recording section 4. The vehicle position calculation section 1 can be a conventional type of vehicle navigation apparatus, which periodically calculates the current position of the vehicle, e.g., at 1-second intervals, and includes an absolute position sensing section 1a which periodically calculates an absolute vehicle position based on signals received from GPS satellites, and a relative position sensing section 1b which periodically determines the current position of the vehicle, measured with respect to a previously obtained absolute position, between time points at which absolute positions are obtained.

The amount of positioning error of an absolute vehicle position that is calculated based on GPS information will depend upon various factors, which include the geometric relationships between the GPS satellites and the vehicle. For example, with four satellites being in view, minimum positioning error results when one satellite is directly overhead and the remaining satellites are close to the horizon, spaced at 120-degree intervals.

The relative position sensing section may for example includes a speed sensor for counting pulses generated at a rate determined by the vehicle speed, for use in determining amounts of distance traversed between successive calculated vehicle positions, in conjunction with a direction sensor for detecting the angular velocity of changes in the heading direction of the vehicle (for example by using a vibration gyroscope).

The vehicle position calculation section 1 may further be configured to utilize stored digital maps for correcting the obtained vehicle positions, i.e., by utilizing each of successive traversed route portions in map matching against the contents of the digital maps, to thereby determine a street or highway which is currently being traversed by the vehicle and thereby increase the degree of navigation accuracy of the system. In addition, the system may apply some degree of compensation for the positioning error in the calculated relative positions, by using the absolute positions to estimate the direction and rate of change of the relative positioning error.

Each time that a vehicle position is thus obtained by the vehicle position calculation section 1, with the resultant position data being transferred to the position data recording judgement section 3, the position accuracy calculation section 2 performs a positioning error calculation operation. Specifically, if the current vehicle position has been calculated as a relative position, the position accuracy calculation section 2 uses predetermined criteria to calculate:

(a) The amount of positioning error of the most recently obtained absolute position. This can be estimated based on factors such as the geometric relationship between the vehicle and the GPS satellites, and will be referred to as the absolute positioning error.

(b) The amount of positioning error resulting from obtaining the relative position, i.e., an error amount which is caused by operation of sensors such as a speed sensor and direction-sensing gyroscope and which increases with time as described hereinabove. This will be referred to as the relative positioning error.

The position accuracy calculation section 2 obtains the sum of the absolute positioning error and relative positioning error, to obtain a total positioning error, which is then supplied to the position data recording judgement section 3.

Each time that a newly derived position for the vehicle is supplied from the vehicle position calculation section 1 to the position data recording judgement section 3, together with the corresponding total positioning error amount supplied from the position accuracy calculation section 2, the position data recording judgement section 3 compares the magnitude of that positioning error with a predetermined threshold value. The position data recording judgement section 3 selects only the data of those vehicle positions for which the total positioning error is lower than the threshold value to be transferred to the position data recording section 4 and recorded thereby.

The basic flow of processing which is executed by the apparatus of FIG. 1 to perform the above operations is illustrated in the simple flow diagram of FIG. 2.

Various types of data storage device might be used to implement the position data recording section 4. Since the storage area of such a device has limited capacity, the respective sets of data expressing vehicle positions which are transferred to the position data recording section 4 from the position data recording judgement section 3 might for example be written into successive addresses of the storage area starting from a first address, with the storage area being successively rewritten (starting from the first address) each time that it becomes filled. A display of the most recent portion of the route which has been traversed by the vehicle can be generated by reading out all or part of the stored data of the position data recording section 4 and supplying these to a suitable display apparatus (not shown in the drawings).

As can be understood from the above, with this embodiment of the invention, only those sets of vehicle position data which express a sufficiently accurate estimation of the current vehicle position will be recorded by the position data recording section 4. Hence, a more accurate display of the vehicle traversed route can be generated than has been possible in the prior art. Furthermore, with the position data recording section 4 having a specific amount of data storage capacity, a longer part of the traversed route can be displayed than has been possible in the prior art, since the number of sets of vehicle position data that are stored in the position data recording section 4 to represent a portion of the traversed route can be reduced. Thus, the data storage capacity requirements of the position data recording section 4 can be reduced, by comparison with the prior art.

In the above it is assumed that judgement of amounts of error, for selecting those vehicle positions that are to be recorded, is applied only to the relative position data, i.e., that all absolute positions are supplied to the recording section 4. However it would be equally possible to also apply such selective judgement processing to the absolute positions.

A second embodiment will be described referring to the general system block diagram of FIG. 3 and the corresponding basic flow diagram of FIG. 4. This embodiment essentially differs from the preceding embodiment in that a navigation satellite number calculation section 6 is utilized in place of the position accuracy calculation section 2 of the first embodiment, while the respective functions of the vehicle position calculation section 1, position data recording judgement section 11 and position data recording section 4 substantially correspond to those of vehicle position calculation section 1, position data recording judgement section 3 and position data recording section 4 of the first embodiment. With this embodiment, the aforementioned absolute position sensing section of the vehicle position calculation section 1 derives, in conjunction with each absolute position, a corresponding absolute heading direction of the vehicle. Similarly, the aforementioned relative position sensing section of the vehicle position calculation section 1 derives, in conjunction with each relative position, a corresponding relative heading direction of the vehicle.

The amount of error in an absolute heading direction derived from GPS information can be estimated based on factors such as the current speed of the motor vehicle. The amount of error in the relative heading direction can be estimated based on the aforementioned amounts of cumulative error which arise from the sensors used to obtain the relative positions. In particular, a sensor such as a vibration gyroscope will produce an amount of direction error which increases as time elapses.

Each time that a new relative position is calculated by the vehicle position calculation section 1 and supplied to the position data recording judgement section 11, the amount of angular error in the corresponding relative heading direction is estimated by the heading direction accuracy calculation section 5, which also estimates the amount of angular error in the most recently obtained absolute heading direction, and obtains the sum of these angular errors as the total direction error. This supplied to the position data recording judgement section 11.

This embodiment makes use of the fact that if there is an excessive amount of error in the calculated heading direction, when the vehicle position is calculated by the vehicle position calculation section 1, then there is a high probability that the calculated vehicle position will not be accurate.

Each time that a newly derived position for the vehicle is supplied from the vehicle position calculation section 1 to the position data recording judgement section 11, together with the corresponding total direction error supplied from the heading direction accuracy calculation section 5, the position data recording judgement section 11 compares the magnitude of that heading direction error with a predetermined threshold value. The position data recording judgement section 11 selects, to be transferred to the position data recording section 4 and recorded thereby, only those vehicle positions for which the corresponding heading direction error amount is smaller than the threshold value.

Figure 3:
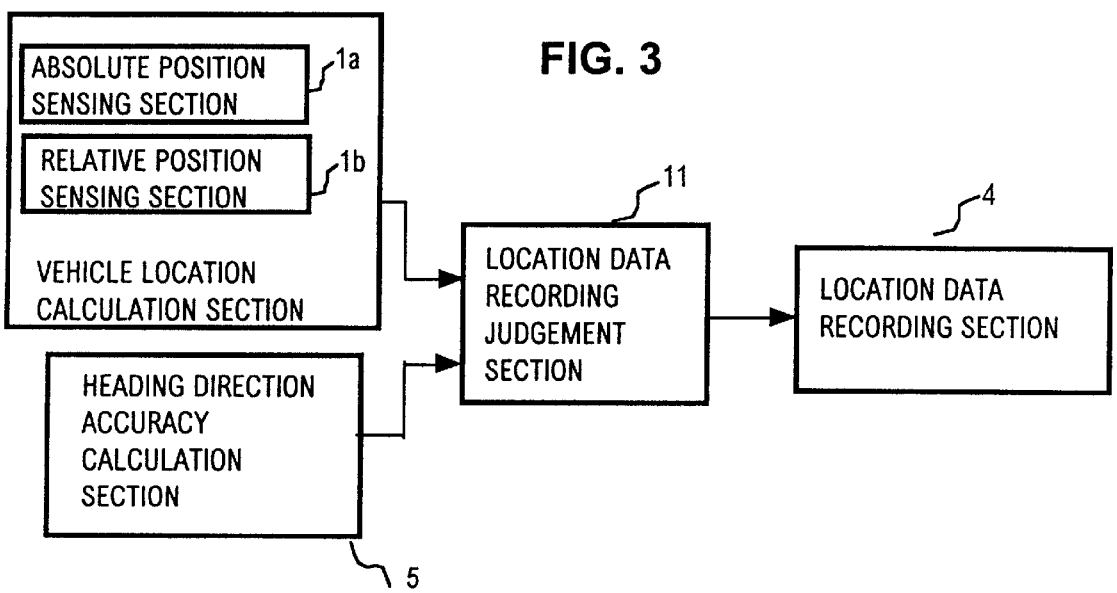
FIG. 3 is a general system block diagram of a second embodiment, in which only vehicle positions having a corresponding amount of heading direction error that is below a predetermined level are selected to be recorded.
Figure 4:
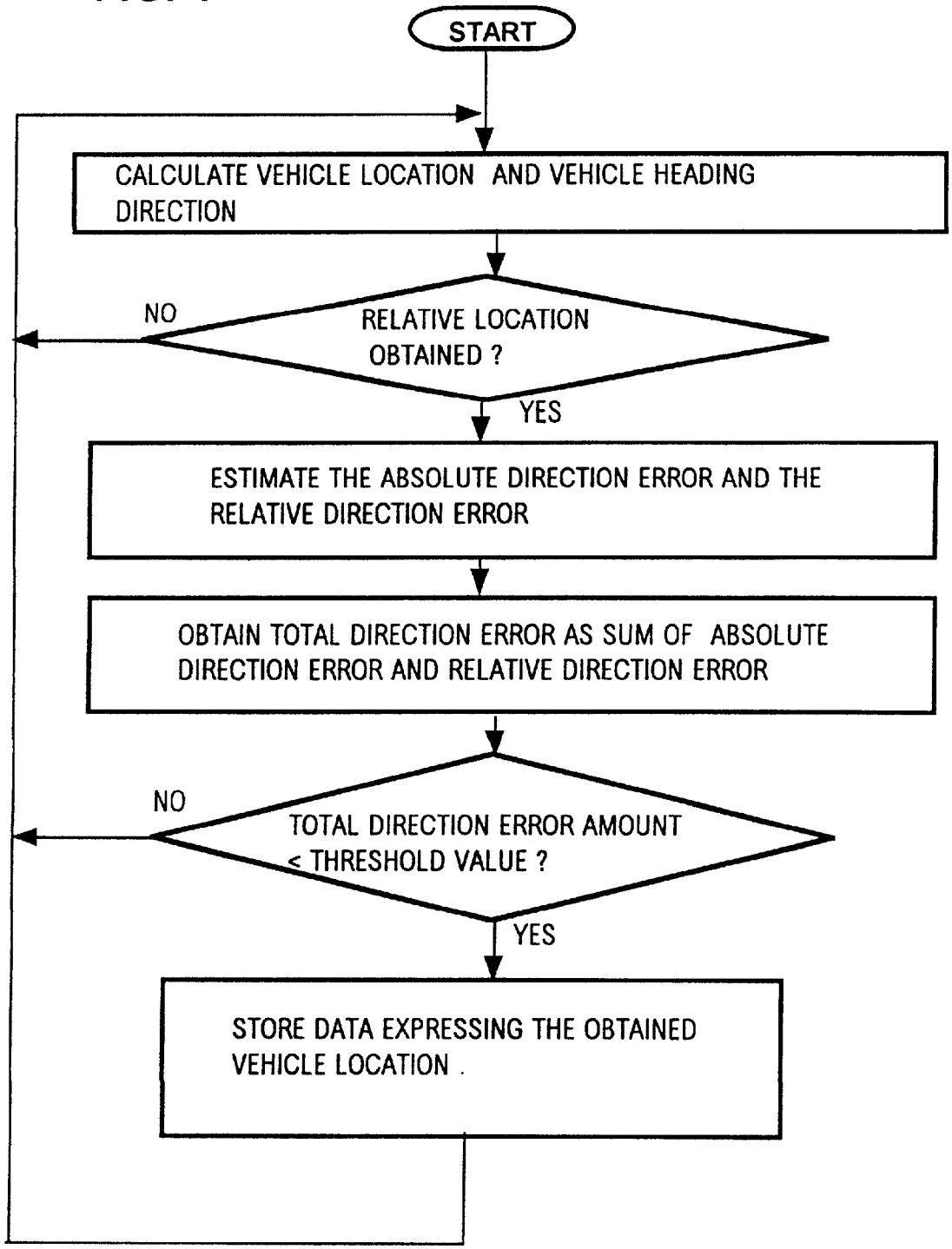
FIG. 4 is a flow diagram for use in describing the operation of the embodiment of FIG. 3.

The basic flow of processing which is executed by the apparatus of FIG. 3 to perform the above operations is illustrated in the simple flow diagram of FIG. 4.

As can be understood from the above, this embodiment can provide similar advantages to those of the first embodiment, by reducing the amount of data expressing inaccurate vehicle position information that will be recorded by the position data recording section 4.

In the above it is assumed that judgement of amounts of heading direction error, for selecting those vehicle positions that are to be recorded, is applied only to the relative position data, i.e., that all absolute positions are supplied to the recording section 4. However it would be equally possible to also apply such selective judgement to the absolute positions.

A third embodiment will be described referring to the general system block diagram of FIG. 5 and the corresponding basic flow diagram of FIG. 6. This embodiment essentially differs from the first embodiment in that a navigation satellite number calculation section 6 is utilized in place of the position accuracy calculation section 2 of the first embodiment, while the respective functions of the vehicle position calculation section 1, position data recording judgement section 12 and position data recording section 4 substantially correspond to those of the vehicle position calculation section 1, position data recording judgement section 3 and position data recording section 4 of the first embodiment.

With this embodiment, each time that the current position of the vehicle is newly calculated by the vehicle position calculation section 1, with the resultant position data being transferred to the position data recording judgement section 12, the navigation satellite number calculation section 6 determines the total number of GPS satellites from which signals were received and utilized to obtain the absolute position data. That number is then supplied by the navigation satellite number calculation section 6 to the position data recording judgement section 3, which compares the number to a predetermined threshold value. If the number of satellites is greater than that threshold value, then the position data recording judgement section 12 transfers the corresponding position data to the position data recording section 4 to be recorded thereby, while if the number of satellites is not above the threshold value, the position data are not transferred to the position data recording section 4.

If the calculated vehicle position is a relative position, then the satellite number corresponding to that relative position is obtained as the satellite number corresponding to the most recently calculated absolute position.

Figure 6:
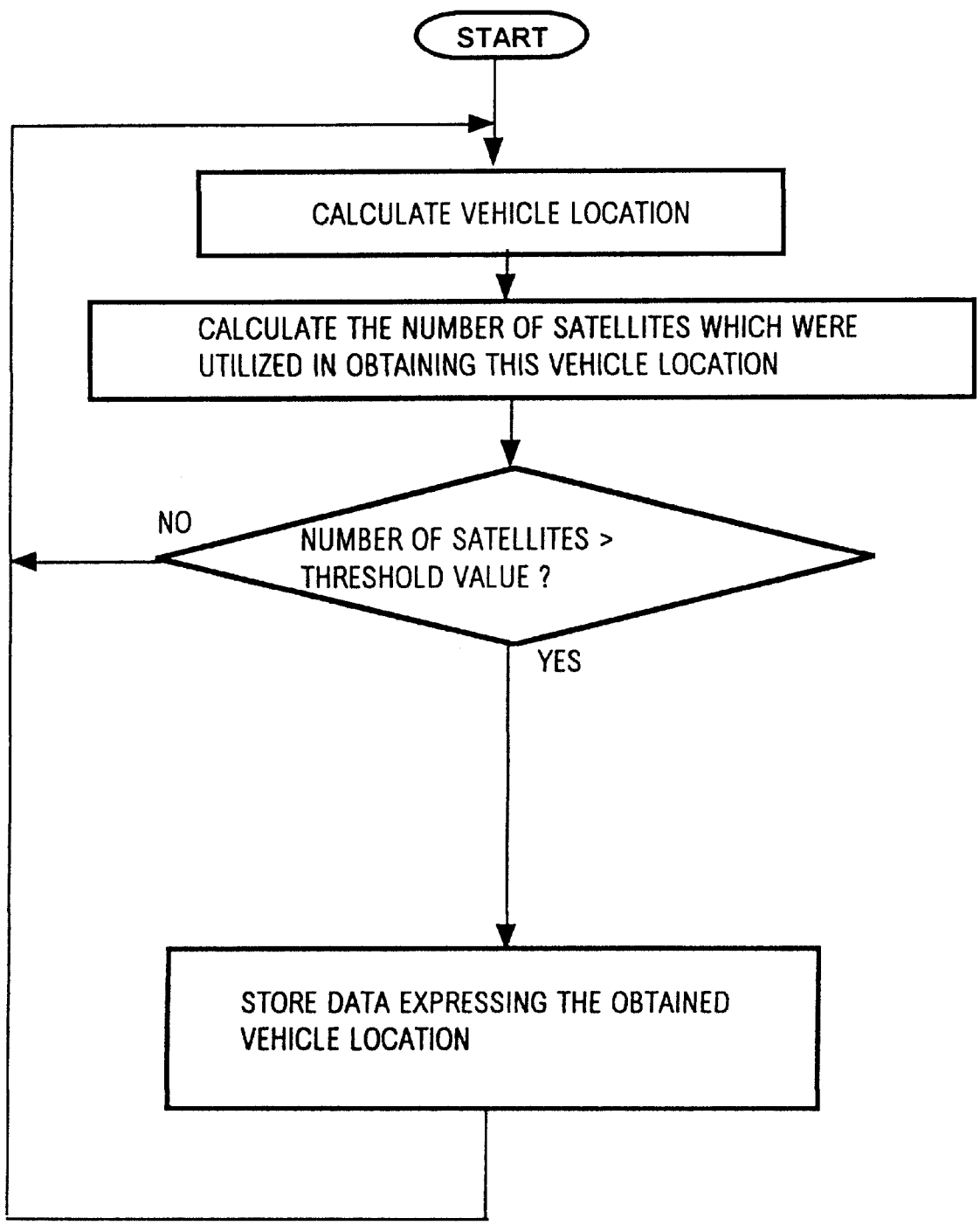
FIG. 6 is a flow diagram for use in describing the operation of the embodiment of FIG. 5.

The basic flow of processing which is executed by the apparatus of FIG. 5 to perform the above operations is illustrated in the simple flow diagram of FIG. 6.

The basis for this embodiment is as follows. While successive sets of absolute vehicle position data are being derived by the vehicle position calculation section 1 based on received signals from a plurality of satellites, it is possible that the reception of signals from one or more of these satellites may be temporarily interrupted due to factors such as changes in weather conditions, obstruction of radio waves by tall buildings as the motor vehicle travels past these, multi-path fading of the radio waves, etc. In such a case, the number of satellites from which signals are received may become insufficient to enable accurate vehicle position information to be derived, i.e., the vehicle position data generated by the vehicle position calculation section 1 may contain an excessive amount of positioning error. Thus with this embodiment, if the number of satellites from which signals are reliably received should fall below a predetermined minimum, then recording by the position data recording section 4 of the vehicle position data which are generated by the vehicle position calculation section 1, under that condition, is inhibited by the position data recording judgement section 12.

As can be understood from the above, this embodiment can provide similar advantages to those of the first embodiment, by reducing the amount of data expressing inaccurate vehicle position information that will be recorded by the position data recording section 4.

A fourth embodiment will be described referring to the general system block diagram of FIG. 7 and the corresponding basic flow diagram of FIG. 8. This embodiment essentially differs from the first embodiment in that a calculation status detection section 7 is utilized in place of the position accuracy calculation section 2 of the first embodiment, while the respective functions and operation of the vehicle position calculation section 1, position data recording judgement section 13 and position data recording section 4 substantially correspond to those of the vehicle position calculation section 1, position data recording judgement section 3 and position data recording section 4 of the first embodiment.

With this embodiment, each time that the position of the vehicle is newly calculated by the vehicle position calculation section 1, the position calculation status detection section 7 derives satellite acquisition status information which specifies whether or not GPS information was successfully acquired and used in calculating the position data. The satellite acquisition status information is supplied to the position data recording judgement section 13, together with the corresponding position data from the vehicle position calculation section 1. The position data recording judgement section 13 transfer only those positions to the position data recording section 4, to be recorded thereby, for which the condition "successful use of GPS information" has occurred, as indicated by the satellite acquisition status information.

The definition of this condition of "successful use of GPS information" will depend upon the type of navigation system. For example, if the vehicle positions are normally obtained as GPS position fixes at periodic intervals, with relative positions being calculated only when GPS signal reception is temporarily blocked, then it might be specified that only the absolute positions (i.e., each obtained directly as a GPS position fix) satisfy the condition "successful use of GPS information". If on the other hand the system normally operates by obtaining GPS position fixes at relatively long periodic intervals, with relative positions being calculated periodically within these long intervals, then those relative positions which are successively calculated after one or more of the regular GPS position fixes has been missed could be considered as not meeting the condition "successful use of GPS information".

Figure 8:
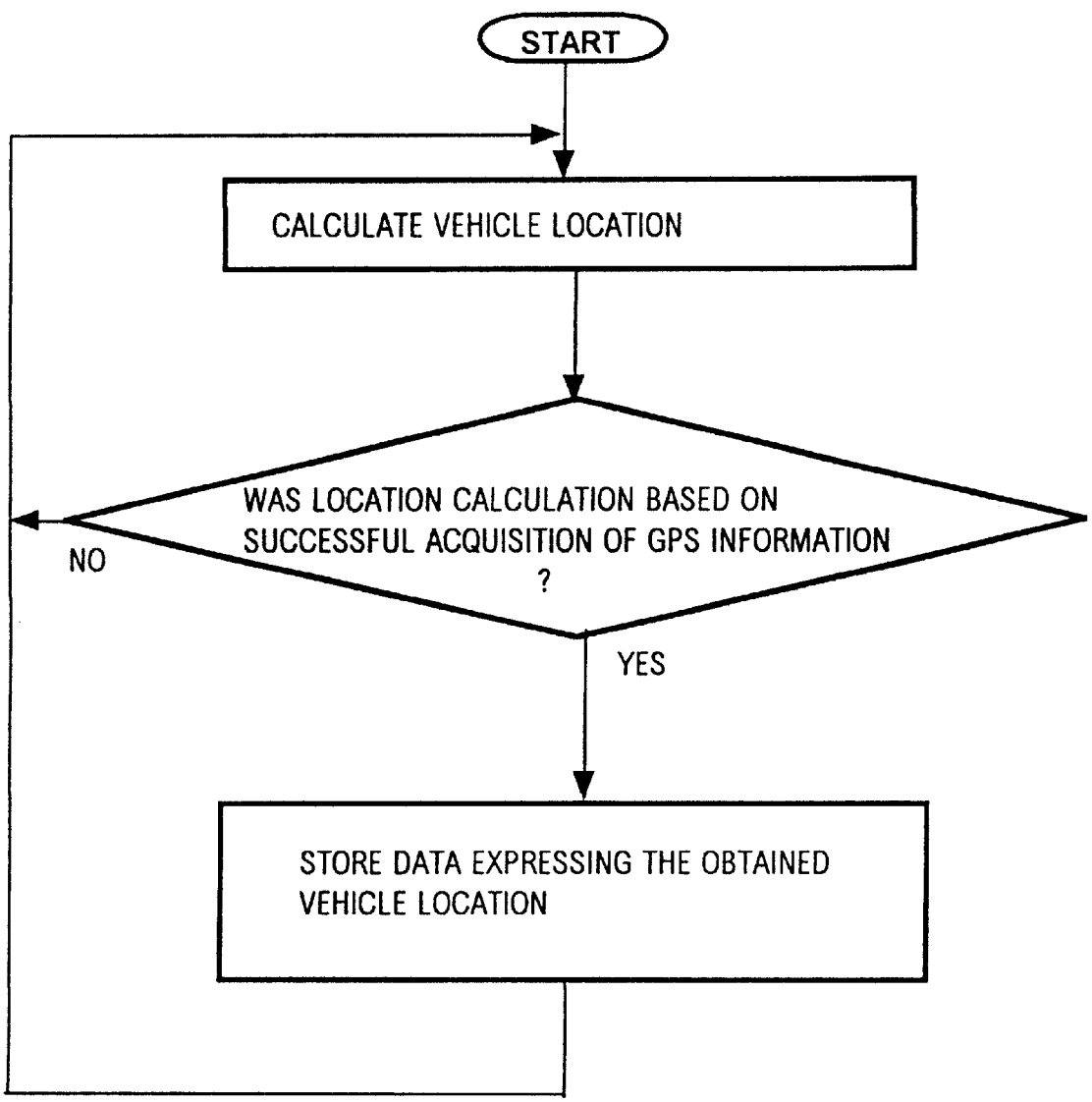
FIG. 8 is a flow diagram for use in describing the operation of the embodiment of FIG. 7.

The basic flow of processing which is executed by the apparatus of FIG. 7 to perform the above operations is illustrated in the simple flow diagram of FIG. 8.

It should be noted that it would be equally possible for a modified embodiment of the invention to be provided which is a combination of the first through fourth embodiments described above. Specifically, such an embodiment would include the position accuracy calculation section 2 of the first embodiment, the heading direction accuracy calculation section 5 of the second embodiment, the navigation satellite number calculation section of the third embodiment and the position calculation status detection section of the fourth embodiment. The position data recording judgement section of such a modified embodiment would judge whether or not a calculated vehicle position is to be recorded by the position data recording section 4 based upon a combination of the corresponding positioning error, direction error, satellite number, and satellite acquisition status information.

A fifth embodiment will be described referring to the general system block diagram of FIG. 9. The overall flow of processing that is executed with this embodiment is illustrated in the flow diagram of FIG. 10. The embodiment is formed of a vehicle position calculation section 1, a position accuracy calculation section 2, a position data transmission judgement section 21, a position data and positioning error recording section 23 and a position data transmitting section 9. The vehicle position calculation section 1 and position accuracy calculation section 2 respectively operate as described for the vehicle position calculation section 1 and position accuracy calculation section 2 of the first embodiment hereinabove. With this embodiment, as each new set of vehicle position data is generated by the vehicle position calculation section 1, that set of data is supplied to the position data and positioning error recording section 22 together with the corresponding amount of estimated total positioning error supplied from the position accuracy calculation section 2, to be respectively recorded. The combination of a vehicle position data set and the corresponding total positioning error value will be considered to constitute a single data record. In addition, data expressing the time at which a vehicle position data set is generated are also supplied to the recording section 22, to be recorded in conjunction with that vehicle position data as part of the corresponding data record.

Various types of data storage devices could be utilized to implement the position data and positioning error recording section 22, as described for the position data recording judgement section 3 of the first embodiment.

Figure 10:
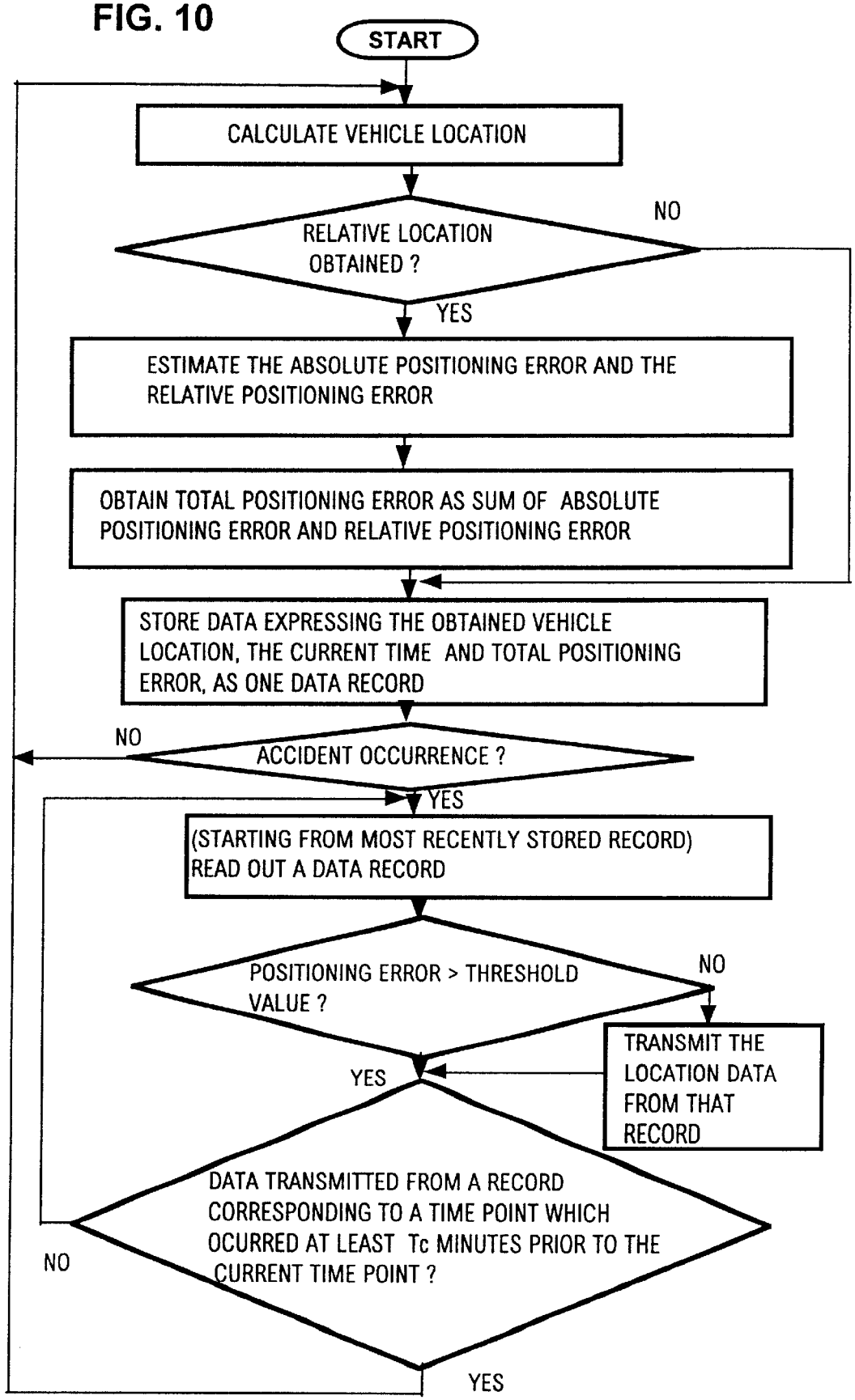
FIG. 10 is a flow diagram for use in describing the operation of the embodiment of FIG. 9.

If an emergency situation such as a traffic accident should occur for the vehicle in which the apparatus of this embodiment is mounted, then as shown in the flow diagram of FIG. 10, the data records which have been stored in the position data and positioning error recording section 22 begin to be successively read out and supplied to the position data transmission judgement section 21. Only the data records which have been recorded during a fixed time interval extending up to the current time point (e.g., the time point of an accident) are read out. In the flow diagram of FIG. 10 that fixed time interval is designated as Tc minutes. In that diagram it is assumed that the data records are sequentially read out starting from the most recently stored data record, back to the record which was stored Tc minutes previously.

When a data record is received by the position data transmission judgement section 21, if it is found to have been recorded within the aforementioned time interval Tc, then the total positioning error corresponding to the vehicle position data of that record is compared with a threshold value, in the same manner as described for the position accuracy calculation section 2 of the first embodiment. If the positioning error is lower than the threshold value, then the vehicle position data are transferred to the position data transmitting section 9 to be transmitted thereby. Specifically, the vehicle position data are converted into suitable digital data form for transmission by radio to an emergency services center, and are then transmitted thereto. The data can for example be adapted to be transmitted via a portable telephone such as a cellular telephone.

In the case of each absolute position, the corresponding absolute positioning error can be treated as constituting the "total positioning error" for that position. Alternatively, the apparatus can simply be configured such that all absolute positions which have been recorded are transmitted by the position data transmitting section 9, without judgement of the corresponding positioning errors being performed by the judgement section 21.

It will be apparent that initiation of the above operations for transmission of vehicle position data could readily be arranged to be performed either by the driver of the vehicle, or performed automatically in response to a signal from a collision sensor, etc.

With this embodiment as can be understood from the above, in the event of an emergency situation occurring, position data expressing the most recently traversed part of the motor vehicle route (i.e., the portion which has been traversed during the aforementioned fixed time interval) can be more rapidly transmitted than has been possible in the prior art, since the position data transmission judgement section 21 selects only position data which can be expected to have a sufficient degree of accuracy, to be transmitted by the position data transmitting section 9. Hence, it becomes possible for an emergency services center to rapidly dispatch assistance such as an ambulance to the position of the emergency situation, since the total amount of data which will be transmitted for indicating that position is reduced.

A sixth embodiment will be described referring to the general system block diagram of FIG. 11. The overall flow of processing that is executed with this embodiment is illustrated in the flow diagram of FIG. 12. The embodiment is formed of a vehicle position calculation section 1, a heading direction accuracy calculation section 5, a position data recording section and direction error recording section 23, a position data transmission judgement section 24 and a position data transmitting section 9. The vehicle position calculation section 1 operates as described for the first embodiment. With this embodiment, the heading direction accuracy calculation section 5 functions as described for the second embodiment to derive an estimated amount of angular error in each calculated vehicle heading direction, i.e., each heading direction that is calculated by the vehicle position calculation section 1 in conjunction with calculation of the vehicle position. When a new set of vehicle position data is calculated by the vehicle position calculation section 1, it is supplied to the position data and direction error recording section 23 to be recorded together with data specifying the current time and the corresponding estimated amount of heading direction error, supplied to the heading direction error recording section 23, to be recorded. Thus with this embodiment, each data record consists of data specifying the vehicle position, the time at which the position was calculated, and the estimated amount of error in heading direction.

When an emergency situation occurs for the motor vehicle in which this apparatus is mounted, then as shown in the flow diagram of FIG. 12, the data records which have been stored in the position data and direction error recording section 23 begin to be successively read out and supplied to the position data transmission judgement section 24, e.g., starting from the most recently stored record.

When a data record is received by the position data transmission judgement section 24, if it is found to have been recorded within a predetermined fixed time interval extending up to the current time point (as described for the preceding embodiment) then the amount of estimated positioning error corresponding to the vehicle position data of that record is compared with a threshold value, in the same manner as described for the position data recording judgement section 11 of the second embodiment. If the positioning error is lower than the threshold value, then the vehicle position data from that record are transferred by the position data transmission judgement section 24 to the position data transmitting section 9, to be converted to a suitable digital signal format and transmitted thereby by radio to an emergency services center.

Thus with this embodiment, data expressing the most recently traversed portion of the route of the motor vehicle can be more rapidly transmitted, in the event of an emergency, than has been possible in the prior art, since the position data transmission judgement section 24 selects for transfer to the position data transmitting section 9 only position data which can be expected to have a sufficient degree of accuracy, as indicated by the amount of estimated error in the heading direction which is calculated when the vehicle position is calculated by the vehicle position calculation section 1. Hence, this embodiment can provide similar advantages to those described for the fifth embodiment.

A seventh embodiment will be described referring to the general system block diagram of FIG. 13. The overall flow of processing that is executed with this embodiment is illustrated in the flow diagram of FIG. 14. The embodiment is formed of a vehicle position calculation section 1, a navigation satellite number calculation section 6, a position data recording and satellite number recording section 25, a position data transmission judgement section 26, and a position data transmitting section 9. The vehicle position calculation section 1, position data transmitting section 9 respectively correspond in function and operation to the correspondingly numbered sections of the first embodiment. The navigation satellite number calculation section 6 functions as described for the second embodiment to derive (when a new vehicle position is calculated) the total number of GPS satellites from which signals were received and used in calculating that position. When a new set of vehicle position data is calculated by the vehicle position calculation section 1, it is supplied to the position data and satellite number recording section 25 to be recorded (together with data specifying the current time) in conjunction with the corresponding satellite number, supplied from the navigation satellite number calculation section 6, to be recorded. Thus with this embodiment, each data record consists of data specifying the vehicle position, the time at which the position was calculated, and the number of satellites whose signals were utilized in the process of calculating that vehicle position.

Figure 14:
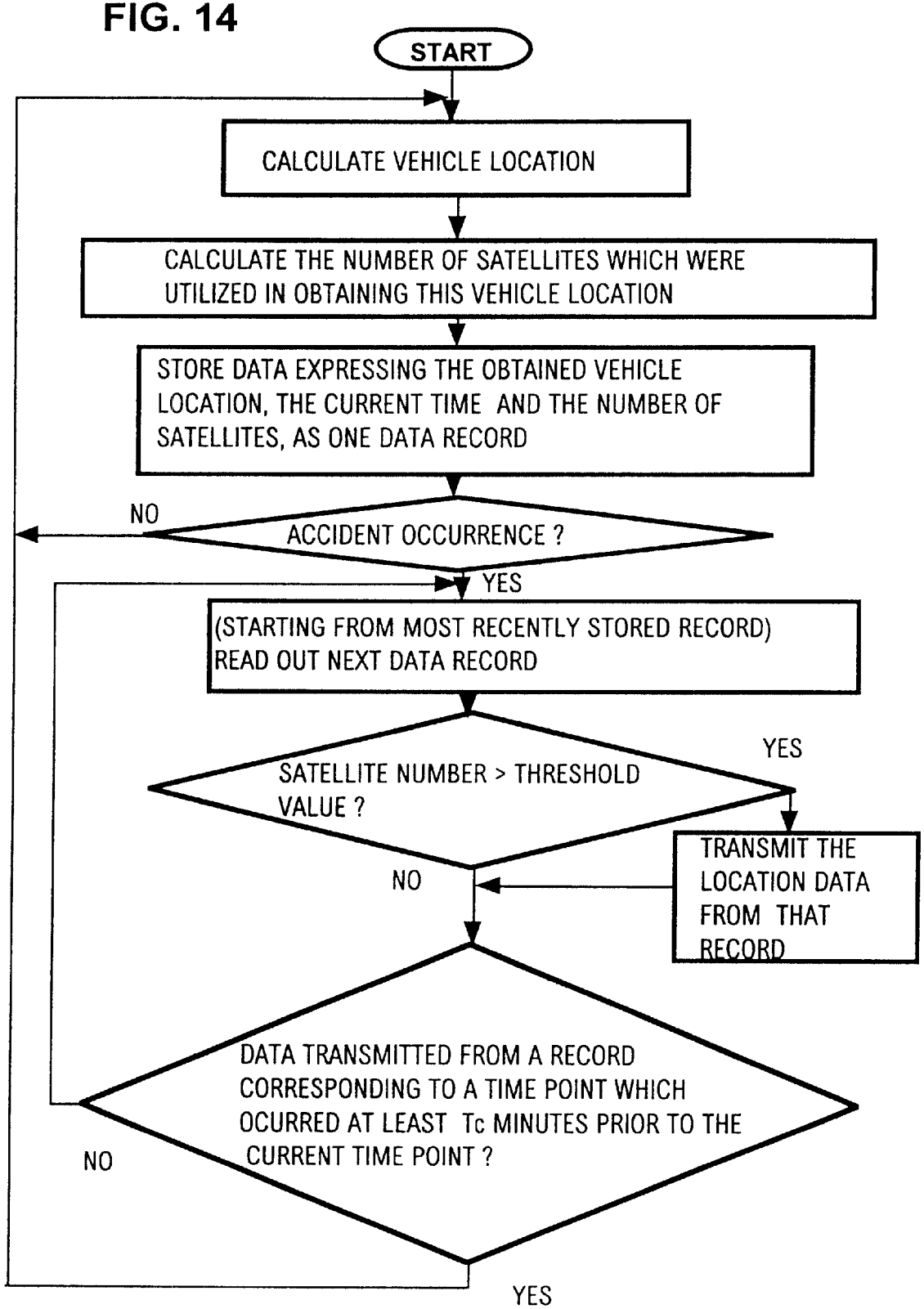
FIG. 14 is a flow diagram for use in describing the operation of the embodiment of FIG. 13.

When an emergency situation occurs for the motor vehicle in which this apparatus is mounted, then as shown in the flow diagram of FIG. 14, the data records which have been stored in the position data and satellite number recording section 25 begin to be successively read out and supplied to the position data transmission judgement section 26, e.g., starting from the most recently stored record. When a data record is received by the position data transmission judgement section 26, if it is found to have been recorded within a predetermined fixed time interval extending up to the current time point then the satellite number corresponding to the vehicle position data of that record is compared with a threshold value, in the same manner as described for the third embodiment. If the number of satellites is greater than the threshold value, then the vehicle position data from that record are transferred by the position data transmission judgement section 26 to the position data transmitting section 9, to be converted to a suitable digital signal format and transmitted thereby by radio to an emergency services center.

Thus with this embodiment, data expressing the most recently traversed portion of the route of the motor vehicle can be more rapidly transmitted, in the event of an emergency, than has been possible in the prior art, since the position data transmission judgement section 26 selects for transfer to the position data transmitting section 9 only position data which can be expected to have a sufficient degree of accuracy, as indicated by the number of satellites from which signals were received for use in calculating the vehicle position data.

An eighth embodiment will be described referring to the general system block diagram of FIG. 15. The overall flow of processing that is executed with this embodiment is illustrated in the flow diagram of FIG. 16. The embodiment is formed of a vehicle position calculation section 1, a position calculation status detection section 7, a position data recording section 20, a calculation status recording section 27, a position data transmission judgement section 28, and a position data transmitting section 9. The vehicle position calculation section 1 and position calculation status detection section 7 respectively function as described for the fourth embodiment above.

When a new vehicle position is calculated by the vehicle position calculation section 1, the position data are supplied to the position data and calculation status recording section 27 to be recorded (together with data specifying the current time) in conjunction with the aforementioned satellite acquisition status information specifying whether or not GPS information was successfully used in calculating the position data. Thus with this embodiment, each data record consists of data specifying the vehicle position, the time at which the position was calculated, and the corresponding satellite acquisition status information.

Figure 16:
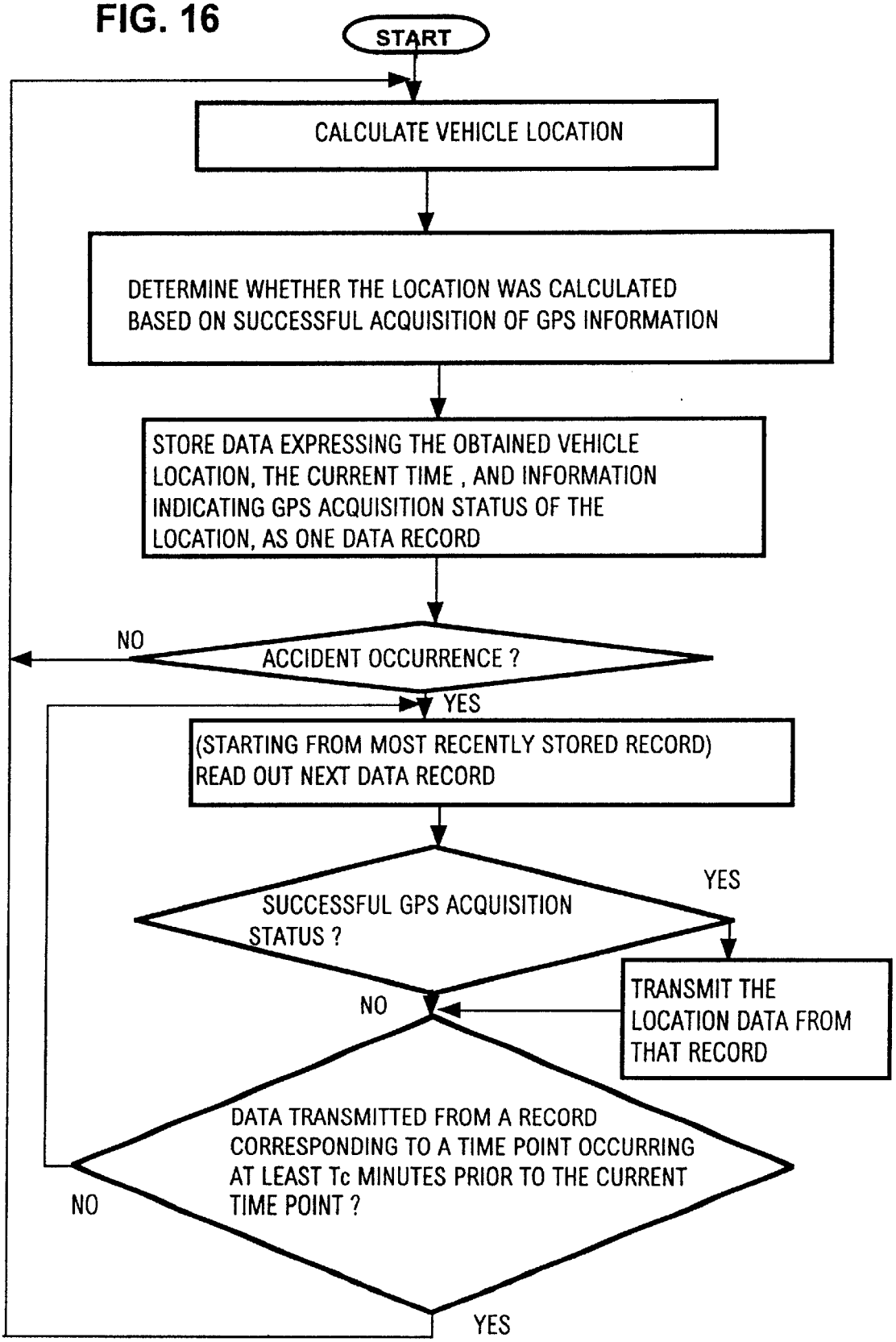
FIG. 16 is a flow diagram for use in describing the operation of the embodiment of FIG. 15.

When an emergency situation occurs for the vehicle in which this apparatus is mounted, then as shown in the flow diagram of FIG. 16, the data records which have been stored in the position data and calculation status recording section 27 begin to be successively read out and supplied to the position data transmission judgement section 28, starting from the most recently stored record.

When a data record is received by the position data transmission judgement section 28, if it is found to have been recorded within a predetermined fixed time interval extending up to the current time point and if the corresponding GPS measurement status is found to be satisfactory as indicated by the satellite acquisition status information, then the position data from that record are transferred by the position data transmission judgement section 28 to the position data transmitting section 9, to be converted to a suitable digital signal format and transmitted thereby by radio to an emergency services center.

Thus with this embodiment, data expressing the most recently traversed portion of the route of the motor vehicle can be more rapidly transmitted, in the event of an emergency, than has been possible in the prior art, since the position data transmission judgement section 28 selects for transfer to the position data transmitting section 9 only position data which can be expected to have a sufficient degree of accuracy, as determined by whether or not GPS signals were successfully used in calculating the position.

It should be noted that it would be equally possible for a modified embodiment of the invention to be provided which is a combination of the fifth through eighth embodiments described above. Specifically, such an embodiment would include the position accuracy calculation section of the fifth embodiment, the heading direction accuracy calculation section of the sixth embodiment, the navigation satellite number calculation section of the seventh embodiment and the position calculation status detection section of the eighth embodiment. The position data transmission judgement section of such a modified embodiment would judge whether or not a calculated vehicle position is to be transmitted by the position data transmitting section 4 based upon a combination of the corresponding positioning error, direction error, satellite number, and satellite acquisition status information.

Figure 17:
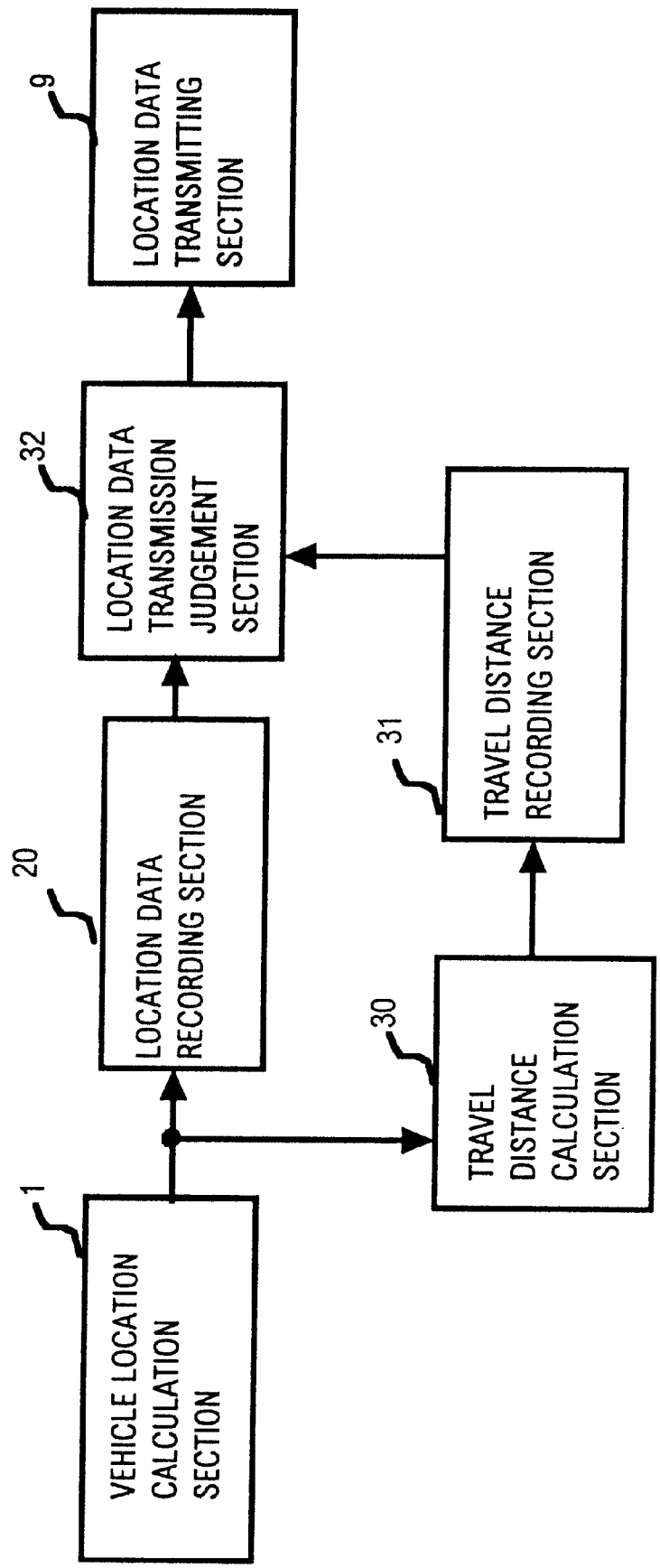
FIG. 17 is a general system block diagram of a ninth embodiment, in which the amounts of vehicle position data transmitted by radio to express a route are varied in accordance with distance from the current position of the vehicle.
Figure 18:
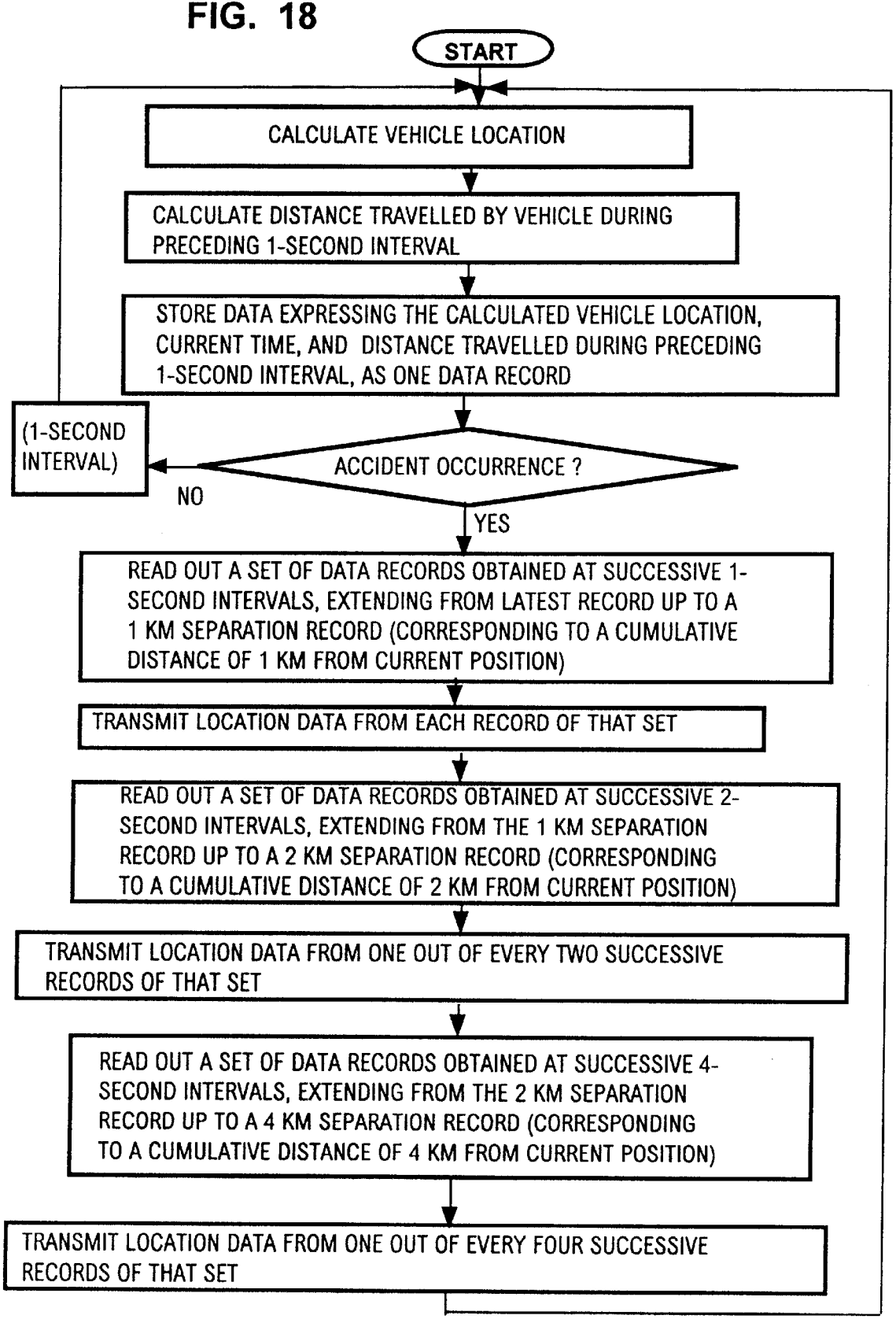
FIG. 18 is a flow diagram for use in describing the operation of the embodiment of FIG. 17.
Figure 19:
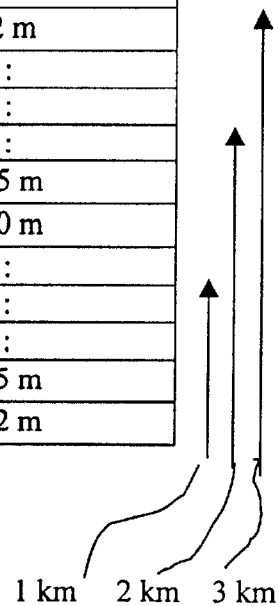
FIG. 19 is a table showing an example of successive data records which are recorded by the embodiment of FIG. 17.

A ninth embodiment will be described referring to the general system block diagram of FIG. 17. The overall flow of processing that is executed with this embodiment is illustrated in the flow diagram of FIG. 18, while FIG. 19 is a table showing an example of a sequence of data records which might be read out and transmitted to an emergency services center in the event of an emergency situation. The embodiment is formed of a vehicle position calculation section 1, a position data transmitting section 9, a position data recording section 20, a travel distance calculation section 30, a travel distance recording section 31, and a position data transmission judgement section 32. The vehicle position calculation section 1, position data recording section 20 and position data transmitting section 9 respectively correspond in function and operation to the correspondingly numbered sections of the preceding embodiments.

With this embodiment, each time that a new set of vehicle position data is calculated by the vehicle position calculation section 1 and supplied to the position data recording section 20), the vehicle position data are also supplied to the travel distance calculation section 30. When this occurs, the travel distance calculation section 30 calculates the distance which the vehicle has traveled in the interval between the time at which this set of vehicle position data was calculated and the time at which the immediately preceding set of vehicle position data was calculated. The calculated distance is then supplied to the travel distance recording section 31, to be recorded thereby.

Thus with this embodiment, each newly generated data record consists of data specifying the current vehicle position and current time, and the distance which the vehicle has traveled since the preceding position calculation operation was executed. In FIGS. 18 and 19 it is assumed that these position calculation operations are successively executed by the vehicle position calculation section 1 at 1-second intervals.

When an emergency situation occurs, successive data records are read out from the travel distance recording section 31 and position data transmission judgement section 32 and supplied to the position data transmission judgement section 32. The manner in which the position data transmission judgement section 32 selects those data records from which vehicle position data are to be selected to be supplied to the position data transmitting section 9 for transmission to an emergency services center, with this embodiment, is as follows. A first set of data records which extend back from the latest record (i.e., the data record corresponding to the time of the emergency situation occurrence) to a record that corresponds to a first fixedly predetermined amount of cumulative travel distance from the current position are selected to be supplied, in their entirety, to the position data transmitting section 9. For the purposes of description, that distance will be assumed to be 1 km, and the corresponding data record will be referred to as the 1 km separation record. Next, for a second set of data records which extend back from the 1 km separation record to a record that corresponds to a second fixedly predetermined amount of travel distance from the current position, only periodically selected ones of these data records are selected to be supplied to the position data transmitting section 9. It will be assumed that the second predetermined travel distance is 2 km, and the data record corresponding to the 2 km distance will be referred to as the 2 km separation record. Next, for a third set of data records which extend back from the 2 km separation record to a record that corresponds to a third fixedly predetermined amount of travel distance from the current position, e.g., a 3 km separation record, the vehicle positions from an even smaller proportion of the corresponding data records are selected to be supplied to the position data transmitting section 9.

The above can be understood from the example of FIG. 19, in which the rows of the table express respective ones of the data records which have been stored in the position data recording section 20 and travel distance recording section 31. It is assumed that an accident has occurred at the point when the time of day is 11:21:03. The respective distances which have been traversed in the intervals between successive calculations of the vehicle position are cumulatively summed, starting from the current position, i.e., as (42+25+. . . ) meters in this example, until a cumulative distance of at least 1 km is reached, with each of the corresponding data records being supplied to the position data transmitting section 9, up to the 1 km separation record (as defined above). The triangle symbols indicate those data records whose vehicle position data are supplied to the position data transmitting section 9 to be transmitted by radio. Thereafter, one out of every two successively stored data records is selected to be supplied to the position data transmitting section 9, until the 2 km separation record is encountered. From that point until the 3 km separation record is reached, one out of every four successive ones of the data records from the position data recording section 20 are selected to be supplied to the position data transmitting section 9.

It is assumed in FIGS. 18 and 19 that the times at which respective sets of vehicle position data are calculated are recorded by the position data recording section 20, however that is not an essential feature of the embodiment.

It can thus be understood that with this example, the degree of precision of specifying the route traversed by the vehicle, when transmitting vehicle position data expressing that route by radio, is maximized for the terminating portion of that route, and is successively decreased for portions of the route which are more distant from the termination point of the route. In that way, the amount of data which must be transmitted by radio, e.g., to an emergency services center for the purpose of having assistance dispatched to the scene of an accident, can be substantially reduced while maintaining sufficient accuracy in specifying the final part of the traversed route. Thus, by omitting specific parts of the vehicle position data which express the vehicle route from being transmitted, the time taken to transmit the route data can be substantially reduced by comparison with the prior art.

With the ninth embodiment as described above, respective values of distance (each traversed between two successively derived vehicle positions) are directly calculated based on the vehicle position data produced from the vehicle position calculation section 1, and stored, to be subsequently read out when necessary. However similar results could of course be obtained by calculating these values of distance based on the vehicle position data which are read out from the position data recording section 20.

Furthermore although the embodiments have been described for application to a vehicle navigation system which is mounted in a vehicle, the invention could equally be applied to a portable type of vehicle navigation system that is adapted to be carried by a pedestrian.

Furthermore the invention is not limited in scope to use with a vehicle navigation system which employs the GPS satellite system, but could be applied to a navigation apparatus which operates from some other satellite navigation system, or which utilizes terrestrial radio signal sources. In addition, the invention could be applied to a mobile body navigation system which does not derive relative positions, but only absolute positions of a mobile body.

It should thus be understood that although the present invention has been described in the above referring to specific embodiments, various modifications to these embodiments or combinations of the features of respective embodiments could be envisaged which fall within the scope claimed for the invention, as set out in the appended claims.

What is claimed is:

1. A position data decimation apparatus for use in a mobile body navigation apparatus having position calculation means for calculating successive positions of a mobile body which transports said apparatus and position recording means for recording data expressing a plurality of said positions, wherein said position data decimation apparatus comprises:

position accuracy indication means for generating, in conjunction with each of said calculated positions, corresponding indication information relating to a positioning accuracy of said calculated position; and position accuracy judgment means for selecting data expressing specific ones of said positions, to be recorded by said position recording means, with said selection based upon judgment of said corresponding indication information, wherein said position calculation means comprises absolute position sensing means for periodically calculating said positions of the mobile body as respective absolute positions based on information from signals transmitted from navigation satellites, and relative position sensing means for periodically calculating said positions of the mobile body as relative positions at times between successive calculations of said absolute positions, and wherein said position accuracy indication means comprises means for calculating, for each of said relative positions, as said indication information:

an absolute positioning error of an absolute position which precedes said relative position, a relative positioning error of said relative position, and the sum of said absolute positioning error and said relative positioning error, as a total positioning error for said relative position.

2. A position data decimation apparatus for use in a mobile body navigation apparatus having position calculation means for calculating successive positions of a mobile body which transports said apparatus and position recording means for recording data expressing a plurality of said positions, wherein said position data decimation apparatus comprises:

position accuracy indication means for generating, in conjunction with each of said calculated positions, corresponding indication information relating to a positioning accuracy of said calculated position, and position accuracy judgment means for selecting data expressing specific ones of said positions, to be recorded by said position recording means, with said selection based upon judgment of said corresponding indication information, wherein said position calculation means comprises absolute position sensing means for periodically calculating said positions of the mobile body as respective absolute positions based on information from signals transmitted from navigation satellites and calculating respectively corresponding absolute heading directions of said mobile body, and relative position sensing means for periodically calculating said positions of the mobile body as relative positions at times between successive calculations of said absolute positions and for calculating respectively corresponding relative heading directions, and wherein said position accuracy indication means comprises heading direction accuracy means for calculating, for each of sa id relative positions:

a direction error of an absolute heading direction obtained for an absolute position which precedes said relative position, a direction error of a relative heading direction obtained for said relative position, and the sum of said direction errors of the absolute heading direction and relative heading direction, as a total direction error for said relative position, to constitute said indication information.

3. A position data decimation apparatus for use in a mobile body navigation apparatus having position calculation means for calculating successive positions of a mobile body which transports said apparatus and position recording means for recording data expressing a plurality of said positions, wherein said position data decimation apparatus comprises:

position accuracy indication means for generating, in conjunction with each of said calculated positions, corresponding indication information relating to a positioning accuracy of said calculated position; and position accuracy judgment means for selecting data expressing specific ones of said positions, to be recorded by said position recording means, with said selection based upon judgment of said corresponding indication information, wherein said position calculation means comprises absolute position sensing means for periodically calculating positions of the mobile body as respective absolute positions based on information from signals transmitted from navigation satellites, and wherein said position accuracy indication means comprises satellite number calculation means for calculating, for each of respective positions obtained by said position calculation means, a total number of said navigation satellites from which signals were acquired and utilized in determining said each position, with said total number constituting said indication information.

4. A position data decimation apparatus for use in a mobile body navigation apparatus having position calculation means for calculating successive positions of a mobile body which transports said apparatus and position recording means for recording data expressing a plurality of said positions, wherein said position data decimation apparatus comprises:

position accuracy indication means for generating, in conjunction with each of said calculated positions, corresponding indication information relating to a positioning accuracy of said calculated position; and position accuracy judgment means for selecting data expressing specific ones of said positions, to be recorded by said position recording means, with said selection based upon judgment of said corresponding indication information, wherein said position calculation means comprises absolute position sensing means for periodically calculating positions of the mobile body as respective absolute positions based on information from signals transmitted from navigation satellites, and wherein said position accuracy indication means comprises position calculation status detection means for obtaining, for each of respective positions obtained by said position calculation means, satellite acquisition status information for indicating whether or not said position was calculated based on successful acquisition of signals from said navigation satellites, with said satellite acquisition status information constituting said indication information.

5. A position data decimation apparatus for use in a mobile body navigation apparatus having position calculation means for calculating successive positions of a mobile body which transports said apparatus and position data transmitting means operable for performing radio transmission of data expressing said positions, wherein said position data decimation apparatus comprises:

position accuracy indication means for generating, in conjunction with each of said calculated positions, corresponding indication information relating to a positioning accuracy of said calculated position, position data and indication information recording means for recording successively obtained ones of said positions in conjunction with respectively corresponding indication information, and position data transmission judgment means operable for reading out a plurality of said recorded positions together with said respectively corresponding indication information, with said plurality of positions extending from a most recently obtained one of said positions up to a position which was obtained a predetermined amount of time prior to the current time point, and for supplying selected ones of said plurality of positions to said position data transmitting means, with said selection based upon judgment of said corresponding indication information, wherein said position calculation means comprises absolute position sensing means for periodically calculating said positions of the mobile body as respective absolute positions based on information from signals transmitted from navigation satellites, and relative position sensing means for periodically calculating said positions of the mobile body as relative positions at times between successive calculations of said absolute positions, and wherein said position accuracy indication means comprises position accuracy calculation means for calculating, for each of said relative positions, as said indication information:

an absolute positioning error of an absolute position which precedes said relative position, a relative positioning error of said relative position, and the sum of said absolute positioning error and said relative positioning error, as a total positioning error for said relative position.

6. A position data decimation apparatus for use in a mobile body navigation apparatus having position calculation means for calculating successive positions of a mobile body which transports said apparatus and position data transmitting means operable for performing radio transmission of data expressing said positions, wherein said. position data decimation apparatus comprises:

position accuracy indication means for generating, in conjunction with each of said calculated positions, corresponding indication information relating to a positioning accuracy of said calculated position, position data and indication information recording means for recording successively obtained ones of said positions in conjunction with respectively corresponding indication information, and position data transmission judgment means operable for reading out a plurality of said recorded positions together with said respectively corresponding indication information, with said plurality of positions extending from a most recently obtained one of said positions up to a position which was obtained a predetermined amount of time prior to the current time point, and for supplying selected ones of said plurality of positions to said position data transmitting means, with said selection based upon judgment of said corresponding indication information, wherein said position calculation means comprises absolute position sensing means for periodically calculating said positions of the mobile body as respective absolute positions based on information from signals transmitted from navigation satellites and calculating respectively corresponding absolute heading directions of said mobile body, and relative position sensing means for periodically calculating said positions of the mobile body as relative positions at times between successive calculations of said absolute positions and for calculating respectively corresponding relative heading directions, and wherein said position accuracy indication means comprises heading direction accuracy means for calculating, for each of said relative positions, as said indication information:

a direction error of an absolute heading direction obtained for an absolute position which precedes said relative position, a direction error of a relative heading direction obtained for said relative position, and the sum of said direction errors of the absolute heading direction and relative heading direction, as a total direction error for said relative position, to constitute said indication information.

7. A position data decimation apparatus for use in a mobile body navigation apparatus having position calculation means for calculating successive positions of a mobile body which transports said apparatus and position data transmitting means operable for performing radio transmission of data expressing said positions, wherein said position data decimation apparatus comprises:

position accuracy indication means for generating, in conjunction with each of said calculated positions, corresponding indication information relating to a positioning accuracy of said calculated position, position data and indication information recording means for recording successively obtained ones of said positions in conjunction with respectively corresponding indication information, and position data transmission judgment means operable for reading out a plurality of said recorded positions together with said respectively corresponding indication information, with said plurality of positions extending from a most recently obtained one of said positions up to a position which was obtained a predetermined amount of time prior to the current time point, and for supplying selected ones of said plurality of positions to said position data transmitting means, with said selection based upon judgment of said corresponding indication information, wherein
said position calculation means comprises absolute position sensing means for periodically calculating positions of the mobile body as respective absolute positions based on information from signals transmitted from navigation satellites, and wherein said position accuracy indication means comprises satellite number calculation means for calculating, for each of respective positions obtained by said position calculation means, a total number of said navigation satellites from which signals were acquired and utilized in determining said each position.

8. A position data decimation apparatus for use in a mobile body navigation apparatus having position calculation means for calculating successive positions of a mobile body which transports said apparatus and position data transmitting means operable for performing radio transmission of data expressing said positions, wherein said position data decimation apparatus comprises:
position accuracy indication means for generating, in conjunction with each of said calculated positions, corresponding indication information relating to a positioning accuracy of said calculated position,
position data and indication information recording means for recording successively obtained ones of said positions in conjunction with respectively corresponding indication information, and
position data transmission judgment means operable for reading out a plurality of said recorded positions together with said respectively corresponding indication information, with said plurality of positions extending from a most recently obtained one of said positions up to a position which was obtained a predetermined amount of time prior to the current time point, and for supplying selected ones of said plurality of positions to said position data transmitting means, with said selection based upon judgment of said corresponding indication information, wherein
said position calculation means comprises absolute position sensing means for periodically calculating positions of the mobile body as respective absolute positions based on information from signals transmitted from navigation satellites, and wherein said position accuracy indication means comprises position calculation status detection means for obtaining, for each of respective positions obtained by said position calculation means, satellite acquisition status information for indicating whether or not said position was calculated based on successful acquisition of signals from said navigation satellites, with said satellite acquisition status information constituting said indication information.

9. A position data decimation apparatus for use in a mobile body navigation apparatus having position calculation means for calculating successive positions of a mobile body which transports said apparatus and position data transmitting means operable for performing radio transmission of data expressing said positions, wherein said position data decimation apparatus comprises:
travel distance calculation means for calculating, in relation to each of said calculated positions of the mobile body, a corresponding travel distance which has been traveled by said mobile body from an immediately preceding one of said positions,
position data and travel distance recording means for recording successively obtained ones of said positions in conjunction with said corresponding travel distances, and
position data transmission judgement means operable for reading out a plurality of said recorded positions together with said corresponding travel distances, and for selecting the data of respective ones of said plurality of positions to be supplied to said position data transmitting means, with said selection being performed in accordance with respective amounts of cumulative distance of said positions from a most recently recorded one of said positions.

10. A position data decimation apparatus according to claim 9, wherein said position data transmission judgement section comprises means for selecting respective positions from at least a first and second set of positions from said plurality of positions, wherein said first set contains positions which extend from said most recently recorded position up to a position which is separated from said most recently recorded position by a first predetermined cumulative distance, and said second set contains positions which extend from said most recently recorded position up to a position which is separated from said most recently recorded position by a second predetermined cumulative distance, and wherein all of said first set of positions are supplied to said position data transmitting means to be transmitted thereby and periodically extracted ones of said second set of positions are supplied to said position data transmitting means to be transmitted thereby.

11. A method of position data decimation for application to a mobile body navigation apparatus having position calculation means for calculating successive positions of a mobile body which transports said apparatus and position recording means for recording data expressing a plurality of said positions, the method comprising:
deriving in conjunction with each of said calculated positions, corresponding indication information relating to a positioning accuracy of said calculated position; and
selecting data expressing respective ones of said calculated positions, to be recorded by said position recording means, with said selection being based upon judgment of said corresponding indication information, wherein
said position calculation means comprises absolute position sensing means for periodically calculating said positions of the mobile body as respective absolute positions based on information from signals transmitted from navigation satellites, and relative position sensing means for periodically calculating said positions of the mobile body as relative positions at times between successive calculations of said absolute positions, and wherein said deriving indication information comprises each of said relative positions:
calculating an absolute positioning error of an absolute position which precedes said relative position,
calculating a relative positioning error of said relative position, and
calculating the sum of said absolute positioning error and said relative positioning error, as a total positioning error for said relative position, with said total positioning error constituting said corresponding indication information.

12. A method of position data decimation for application to a mobile body navigation apparatus having position calculation means for calculating successive positions of a mobile body which transports said apparatus and position recording means for recording data expressing a plurality of said positions, the method comprising:

deriving in conjunction with each of said calculated positions, corresponding indication information relating to a positioning accuracy of said calculated position; and selecting data expressing respective ones of said calculated positions, to be recorded by said position recording means, with said selection being based upon judgment of said corresponding indication information, wherein said position calculation means comprises absolute position sensing means for periodically calculating said positions of the mobile body as respective absolute positions based on information from signals transmitted from navigation satellites and calculating respectively corresponding absolute heading directions of said mobile body, and relative position sensing means for periodically calculating said positions of the mobile body as relative positions at times between successive calculations of said absolute positions and for calculating respectively corresponding relative heading directions, and wherein said wherein said deriving corresponding indication information comprises, for each of said relative positions:

calculating a direction error of an absolute heading direction obtained for an absolute position which precedes said relative position, calculating a direction error of a relative heading direction obtained for said relative position, and calculating the sum of said direction errors of the absolute heading direction and relative heading direction, as a total direction error for said relative position, to constitute said corresponding indication information.

13. A method of position data decimation for application to a mobile body navigation apparatus having position calculation means for calculating successive positions of a mobile body which transports said apparatus and position recording means for recording data expressing a plurality of said positions, the method comprising:

deriving in conjunction with each of said calculated positions, corresponding indication information relating to a positioning accuracy of said calculated position; and selecting data expressing respective ones of said calculated positions, to be recorded by said position recording means, with said selection being based upon judgment of said corresponding indication information, wherein said position calculation means comprises absolute position sensing means for periodically calculating positions of the mobile body as respective absolute positions based on information from signals transmitted from navigation satellites, and wherein said deriving corresponding indication information comprises, for each of respective positions obtained by said position calculation means, calculating a total number of said navigation satellites from which signals were acquired and utilized in determining said each position, with said number of navigation satellites constituting said corresponding indication information.

14. A method of position data decimation for application to a mobile body navigation apparatus having position calculation means for calculating successive positions of a mobile body which transports said apparatus and position recording means for recording data expressing a plurality of said positions, the method comprising:

deriving in conjunction with each of said calculated positions, corresponding indication information relating to a positioning accuracy of said calculated position; and selecting data expressing respective ones of said calculated positions, to be recorded by said position recording means, with said selection being based upon judgment of said corresponding indication information, wherein said position calculation means comprises absolute position sensing means for periodically calculating positions of the mobile body as respective absolute positions based on information from signals transmitted from navigation satellites, and wherein said deriving corresponding indication information comprises deriving, for each of respective positions obtained by said position calculation means, satellite acquisition status information for indicating whether or not said position was calculated based on successful acquisition of signals from said navigation satellites, with said satellite acquisition status information constituting said corresponding indication information.

15. A method of position data decimation for application to a mobile body navigation apparatus having position calculation means for calculating successive positions of a mobile body which transports said apparatus and position data transmitting means operable for performing radio transmission of data expressing said positions, the method comprising:

deriving, in conjunction with each of said calculated positions, corresponding indication information relating to a positioning accuracy of said calculated position, recording successively obtained ones of said positions in conjunction with said corresponding indication information, reading out a plurality of said recorded positions together with said corresponding indication information, with said plurality of positions extending from a most recently obtained one of said positions up to a position which was obtained a predetermined amount of time prior to the current time point, and selecting data expressing respective ones of said plurality of positions, to be supplied to said position data transmitting means, with said selection being based upon judgment of said corresponding indication information, wherein said position calculation means comprises absolute position sensing means for periodically calculating said positions of the mobile body as respective absolute positions based on information from signals transmitted from navigation satellites, and relative position sensing means for periodically calculating said positions of the mobile body as relative positions at times between successive calculations of said absolute positions, and wherein said deriving corresponding indication information comprises, for each of said relative positions:

calculating an absolute positioning error of an absolute position which precedes said relative position, calculating a relative positioning error of said relative position, and calculating the sum of said absolute positioning error and said relative positioning error, as a total positioning error for said relative position, with said total positioning error constituting said corresponding indication information.

16. A method of position data decimation for application to a mobile body navigation apparatus having position calculation means for calculating successive positions of a mobile body which transports said apparatus and position data transmitting means operable for performing radio transmission of data expressing said positions, the method comprising:
  deriving, in conjunction with each of said calculated positions, corresponding indication information relating to a positioning accuracy of said calculated position,
  recording successively obtained ones of said positions in conjunction with said corresponding indication information,
  reading out a plurality of said recorded positions together with said corresponding indication information, with said plurality of positions extending from a most recently obtained one of said positions up to a position which was obtained a predetermined amount of time prior to the current time point, and
  selecting data expressing respective ones of said plurality of positions, to be supplied to said position data transmitting means, with said selection being based upon judgment of said corresponding indication information, wherein
    said position calculation means comprises absolute position sensing means for periodically calculating said positions of the mobile body as respective absolute positions based on information from signals transmitted from navigation satellites and calculating respectively corresponding absolute heading directions of said mobile body, and relative position sensing means for periodically calculating said positions of the mobile body as relative positions at times between successive calculations of said absolute positions and for calculating respectively corresponding relative heading directions, and wherein said deriving corresponding indication information comprises, for each of said relative positions:
      calculating a direction error of an absolute heading direction obtained for an absolute position which precedes said relative position,
      calculating a direction error of a relative heading direction obtained for said relative position, and
      calculating the sum of said direction errors of the absolute heading direction and relative heading direction, as a total direction error for said relative position, to constitute said indication information.

17. The method of position data decimation according to claim 16, wherein said position calculation means comprises absolute position sensing means for periodically calculating positions of the mobile body as respective absolute positions based on information from signals transmitted from navigation satellites, and wherein said step of deriving corresponding indication information comprises, for each of respective positions obtained by said position calculation means, calculating a total number of said navigation satellites from which signals were acquired and utilized in determining said each position.

18. A method of position data decimation for application to a mobile body navigation apparatus having position calculation means for calculating successive positions of a mobile body which transports said apparatus and position data transmitting means operable for performing radio transmission of data expressing said positions, the method comprising:
  deriving, in conjunction with each of said calculated positions, corresponding indication information relating to a positioning accuracy of said calculated position,
  recording successively obtained ones of said positions in conjunction with said corresponding indication information,
  reading out a plurality of said recorded positions together with said corresponding indication information, with said plurality of positions extending from a most recently obtained one of said positions up to a position which was obtained a predetermined amount of time prior to the current time point, and
  selecting data expressing respective ones of said plurality of positions, to be supplied to said position data transmitting means, with said selection being based upon judgment of said corresponding indication information, wherein
    said position calculation means comprises absolute position sensing means for periodically calculating positions of the mobile body as respective absolute positions based in information from signals transmitted from navigation satellites, and wherein said deriving corresponding indication information comprises, for each of respective positions obtained by said position calculation means, satellite acquisition status information for indicating whether or not said position was calculated based on successful acquisition of signals from said navigation satellites, with said satellite acquisition status information constituting said indication information.

19. A method of position data decimation apparatus for application to a mobile body navigation apparatus having position calculation means for calculating successive positions of a mobile body which transports said apparatus and position data transmitting means operable for performing radio transmission of data expressing said positions, the method comprising steps of:
  calculating, in relation to each of said calculated positions of the mobile body, a corresponding travel distance which has been traveled by said mobile body from an immediately preceding one of said positions,
  recording successively obtained ones of said positions in conjunction with said corresponding travel distances,
  at a time subsequent to recording a plurality of said positions and corresponding travel distances, reading out said plurality of recorded positions together with said corresponding travel distances,
  for each position thus read out, calculating a cumulative distance of said position from a most recently recorded one of said positions, based on said travel distances,
  selecting specific ones of said plurality of positions, with said selected positions being determined in accordance with respective amounts of cumulative distance from said most recently recorded position, and
  supplying said selected positions to said position data transmitting means, to be transmitted by radio.

* * * * *

UNITED STATES PATENT AND TRADEMARK OFFICE
CERTIFICATE OF CORRECTION

PATENT NO.     : 6,480,784 B2
DATED          : November 12, 2002
INVENTOR(S)    : Masuru Mizuno It is certified that error appears in the above-identified patent and that said Letters Patent is hereby corrected as shown below:

<u>Title page,</u>
Item [56], FOREIGN PATENT DOCUMENTS, change "0 523 860 A3" to
-- 0 523 860 A2 --.

<u>Column 19,</u>
Line 64, change "said." to -- said --.

Signed and Sealed this

Third Day of June, 2003

JAMES E. ROGAN
*Director of the United States Patent and Trademark Office*